(12) United States Patent
Tamura

(10) Patent No.: US 8,369,746 B2
(45) Date of Patent: Feb. 5, 2013

(54) CLUTCH MECHANISM AND PROCESSING DEVICE AND IMAGE FORMING APPARATUS COMPRISING THE CLUTCH MECHANISM

(75) Inventor: Yuuki Tamura, Osaka (JP)

(73) Assignee: Kyocera Mita Corporation (JP)

( * ) Notice: Subject to any disclaimer, the term of this patent is extended or adjusted under 35 U.S.C. 154(b) by 302 days.

(21) Appl. No.: 12/972,800

(22) Filed: Dec. 20, 2010

(65) Prior Publication Data

US 2011/0158695 A1 Jun. 30, 2011

(30) Foreign Application Priority Data

Dec. 24, 2009 (JP) ................................. 2009-292176
Feb. 26, 2010 (JP) ................................. 2010-042940

(51) Int. Cl.
*G03G 15/00* (2006.01)
*F16D 11/04* (2006.01)
(52) U.S. Cl. ..................... 399/167; 399/223; 192/69.8
(58) Field of Classification Search .................. 399/167, 399/223; 192/69.81, 46, 69.8, 69.6
See application file for complete search history.

(56) References Cited

U.S. PATENT DOCUMENTS

| 4,352,418 A | * | 10/1982 | Teraoka | 192/36 |
| 5,769,398 A | * | 6/1998 | Samejima | 254/352 |
| 2003/0138270 A1 | | 7/2003 | Matsuoka | |
| 2009/0102407 A1 | * | 4/2009 | Klemm et al. | 318/432 |
| 2010/0108454 A1 | * | 5/2010 | Takada et al. | 192/43 |

FOREIGN PATENT DOCUMENTS

JP 2003-208024 7/2003

* cited by examiner

*Primary Examiner* — G. M. Hyder
(74) *Attorney, Agent, or Firm* — Gerald E. Hespos; Michael J. Porco; Matthew T. Hespos

(57) ABSTRACT

Clutch mechanism includes support plate, input element to which driving force is input, output element configured to rotate upon receiving driving force, first elastic member configured to bias output element toward support plate, first member including sliding arm inserted through through-hole of support plate and first slide surface, and second member configured to accommodate first member and including second slide surface. Insertion of the sliding arm into through-hole prevents rotation of first member with respect to support plate but allows first member to approach and move away from support plate. Output element moves apart from input element to cut off driving force when second member is in first rotational position. When second member rotates to second rotational position, output element outputs driving force transmitted from input element.

11 Claims, 15 Drawing Sheets

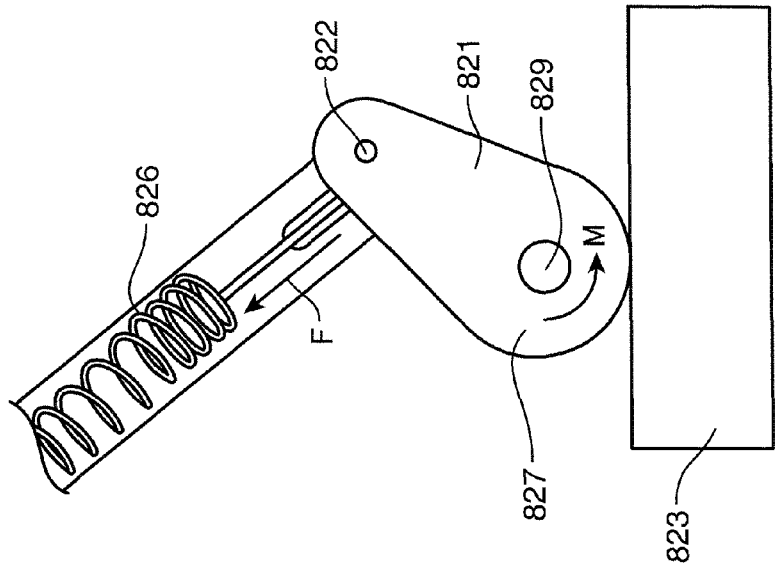
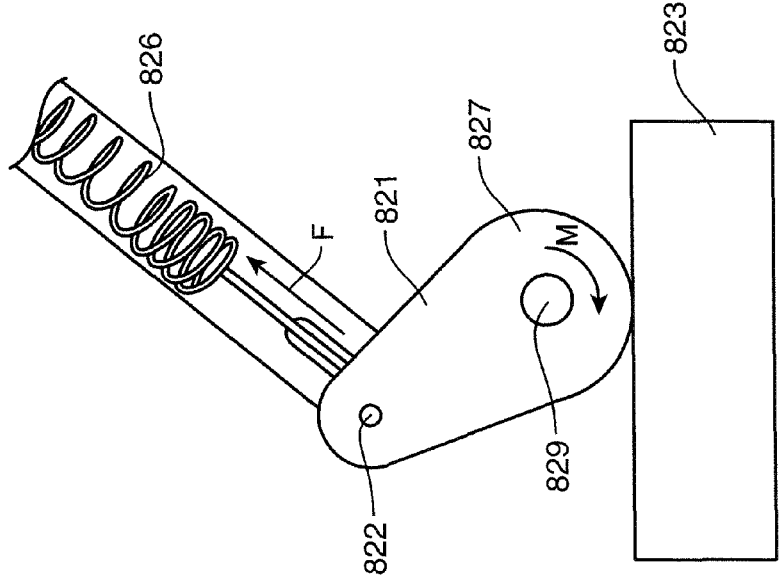

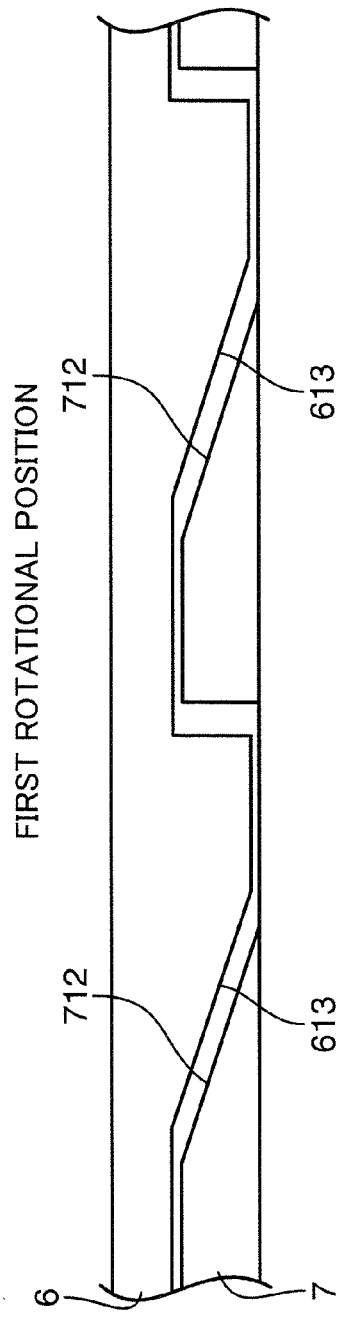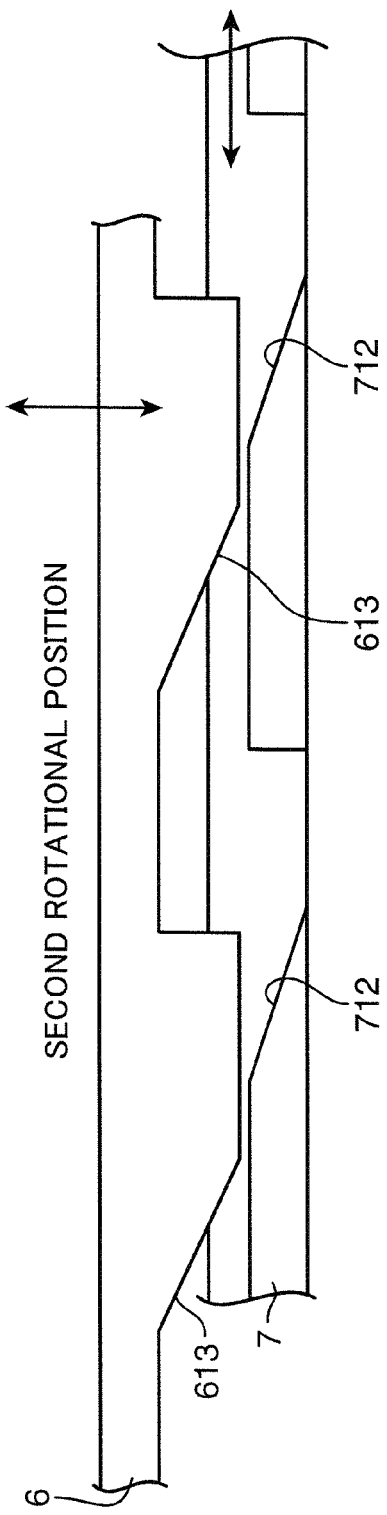

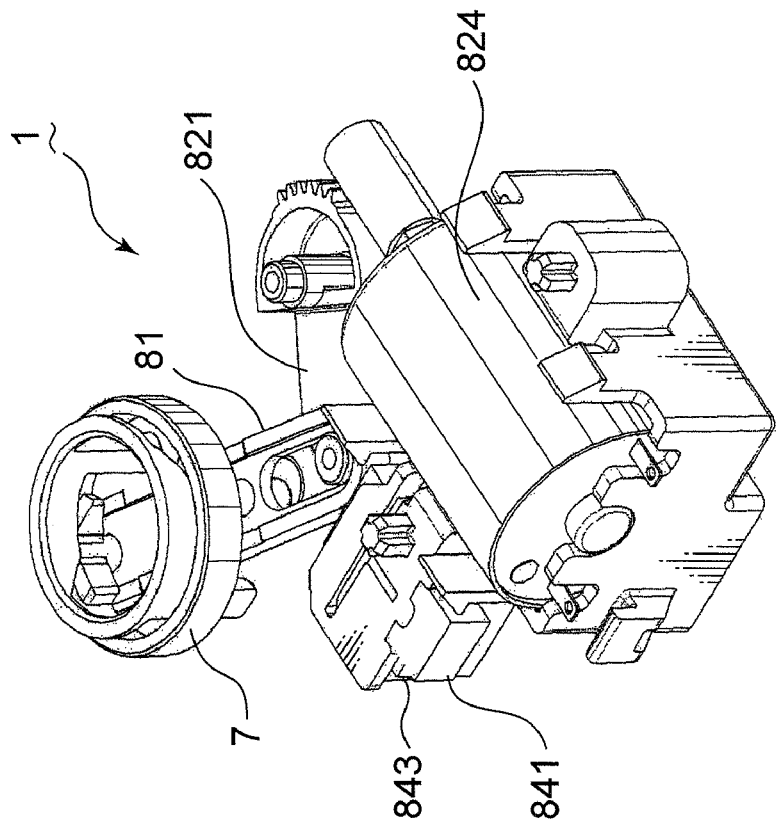
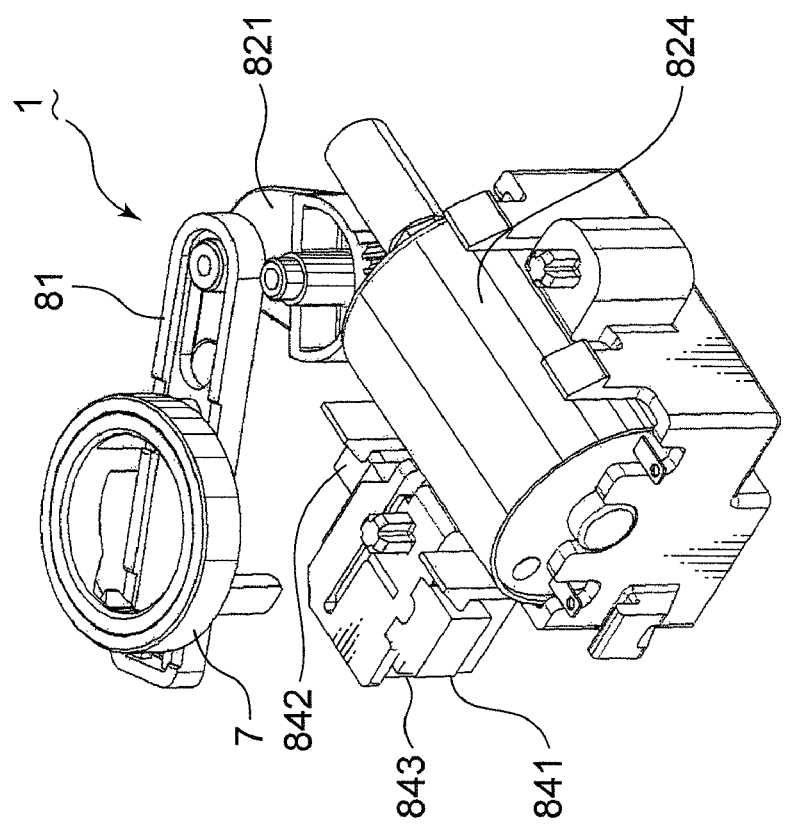

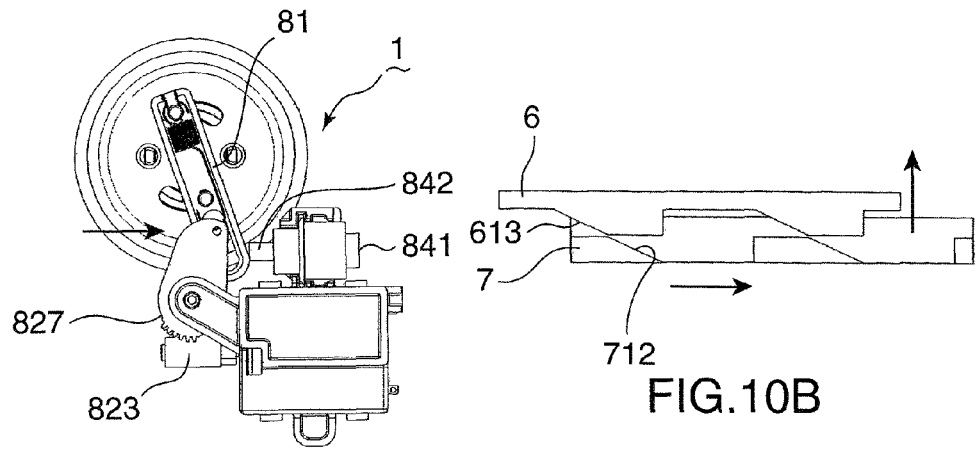
FIG.10A
FIG.10B
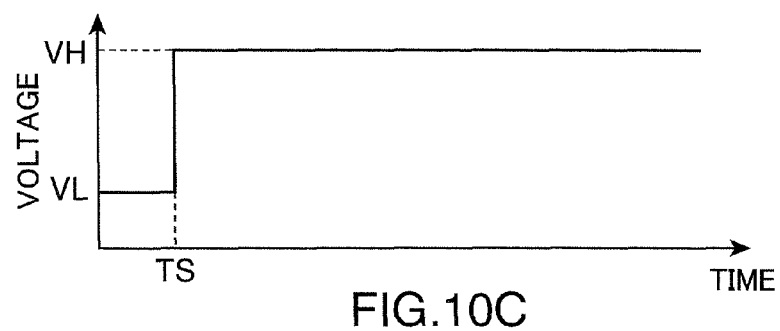
FIG.10C
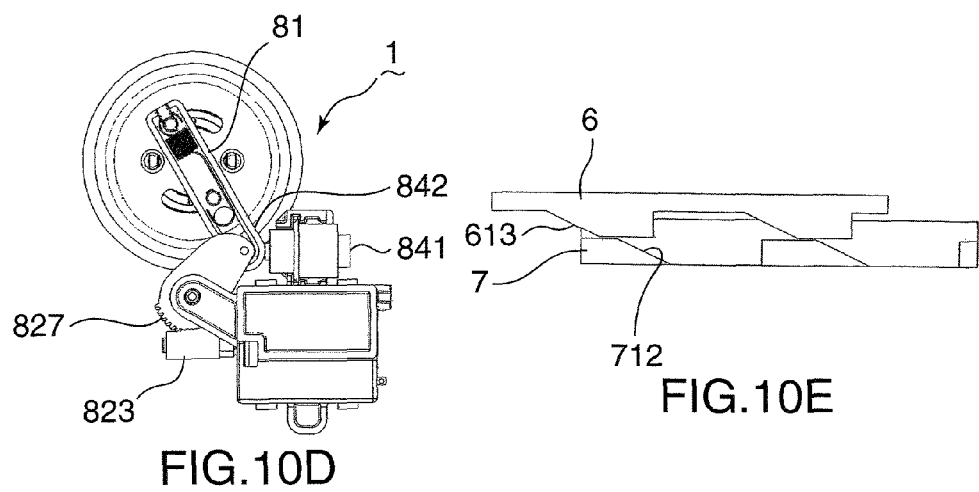
FIG.10D
FIG.10E

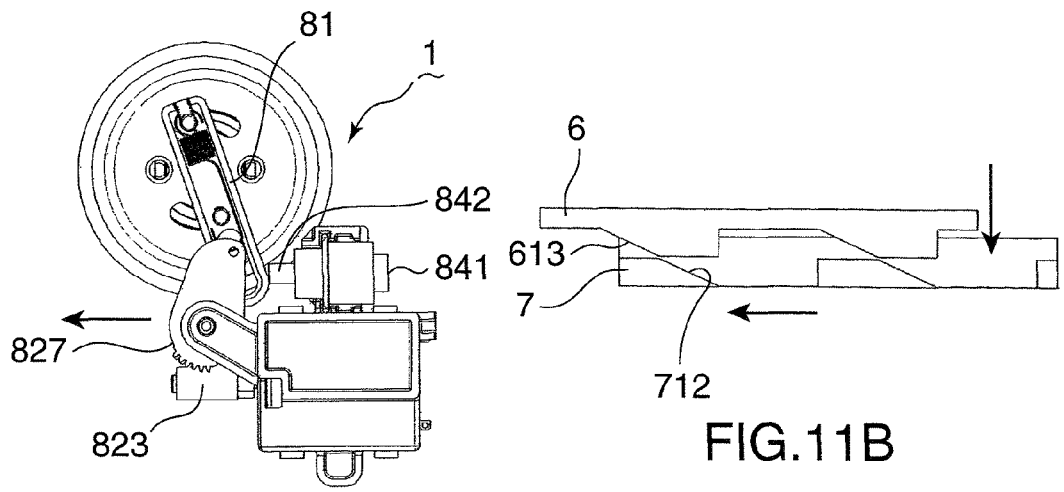
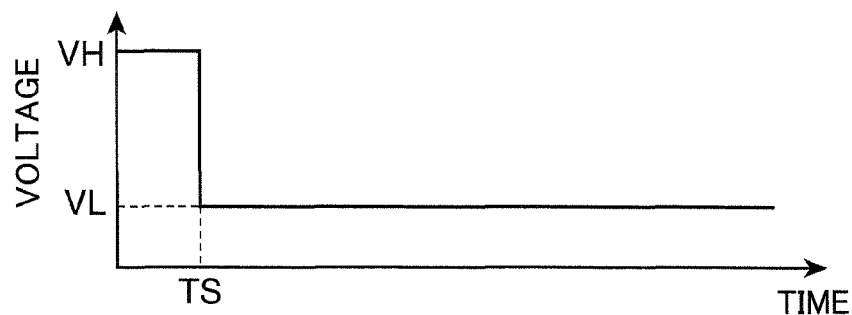
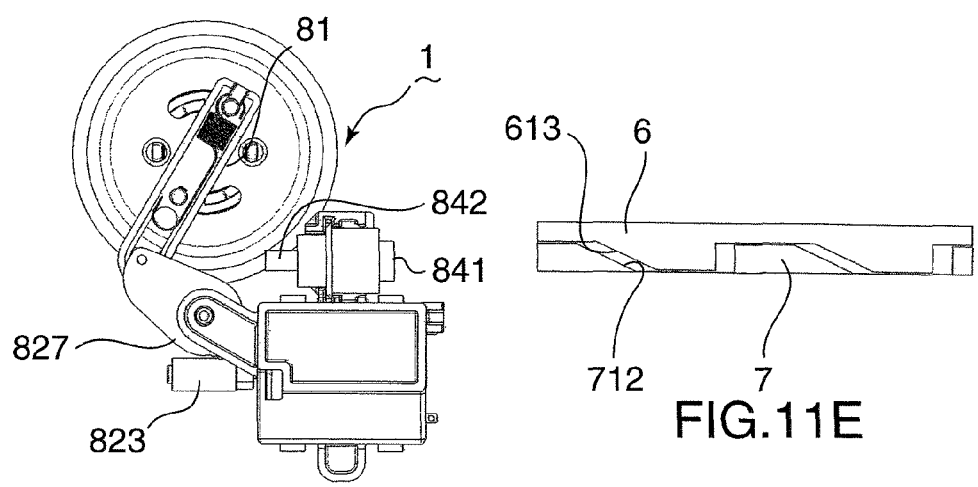

CLUTCH MECHANISM AND PROCESSING DEVICE AND IMAGE FORMING APPARATUS COMPRISING THE CLUTCH MECHANISM

BACKGROUND OF THE INVENTION

1. Field of the Invention

The present invention relates to a clutch mechanism for intermittently transmitting a driving force from a drive source, as well as to a processing device and an image forming apparatus with the clutch mechanism.

2. Description of the Related Art

A clutch mechanism for intermittently transmitting a driving force from a drive source is used in various types of machinery and equipment. An electromagnetic clutch is sometimes used as the clutch mechanism. The electromagnetic clutch configured to electromagnetically control transmission of a driving force is used in various types of machinery and equipment, but is unsuitable for transmitting a larger driving force. A larger size of the electromagnetic clutch is likely to be used to transmit a larger driving force. The electromagnetic clutch is also not appropriate for saving power because an electromagnetic coil in the electromagnetic clutch consumes power while the electromagnetic clutch transmits the driving force. Moreover, it is problematic for the power consumption of the electromagnetic coil to generate heat.

A mechanical clutch mechanism is also sometimes used as the clutch mechanism. For example, a mechanical clutch mechanism is built into an image forming apparatus. The mechanical clutch mechanism may transmit a larger driving force.

A mechanical clutch mechanism is typically assembled with a larger number of components. A miniaturized clutch mechanism is formed from smaller components. The miniaturization of the components of the clutch mechanism leads to vulnerability of the clutch mechanism.

SUMMARY OF THE INVENTION

An object of the present invention is to provide a downsized clutch mechanism with higher strength as well as a processing device and an image forming apparatus including the clutch mechanism.

A clutch mechanism for transmitting driving force from a drive source according to one aspect of the present invention includes: a support plate formed with a through-hole; an input element rotatably mounted on the support plate, the driving force from the drive source being input to the input element; an output element arranged between the support plate and the input element and mounted on the support plate so as to rotate upon receiving the driving force from the input element; a first elastic member arranged between the input element and the output element and configured to bias the output element toward the support plate; a first member arranged between the output element and the support plate and including a first slide surface and a sliding arm inserted through the through-hole; and a second member configured to accommodate the first member and including a second slide surface confronting the first slide surface, wherein insertion of the sliding arm through the through-hole allows the first member to approach and move away from the support plate, when the second member is at a first rotational position where the second member accommodates the first member, the first elastic member moves the output element apart from the input element to cut off transmission of the driving force from the input element to the output element, when the second member rotates from the first rotational position to a second rotational position so that the second slide surface moves toward the first slide surface, the first member pushed out from the second member by the first slide surface and the second slide surface presses the output element against the input element, so that the output element outputs the driving force transmitted from the input element.

A processing device for performing predetermined processing according to another aspect of the present invention includes: a drive source; a processing unit configured to perform a given operation by a driving force from the drive source; and a clutch mechanism configured to intermittently transmit the driving force from the drive source to the processing unit, wherein the clutch mechanism includes: a support plate formed with a through-hole; an input element rotatably mounted on the support plate, the driving force from the drive source being input to the input element; an output element arranged between the support plate and the input element and mounted on the support plate so as to rotate upon receiving the driving force from the input element; a first elastic member arranged between the input element and the output element and configured to bias the output element toward the support plate; a first member arranged between the output element and the support plate and including a first slide surface and a sliding arm inserted through the through-hole; and a second member configured to accommodate the first member and including a second slide surface confronting the first slide surface, wherein insertion of the sliding arm through the through-hole allows the first member to approach and move apart from the support plate, when the second member is at a first rotational position where the second member accommodates the first member, the first elastic member moves the output element apart from the input element to cut off transmission of the driving force from the input element to the output element, and when the second member rotates from the first rotational position to a second rotational position so that the second slide surface moves toward the first slide surface, the first member pushed out from the second member by the first slide surface and the second slide surface presses the output element against the input element, so that the output element outputs the driving force transmitted from the input element.

An image forming apparatus for forming a toner image on a sheet according to yet another aspect of the present invention includes: an image bearing element configured to bear the toner image; a development device configured to supply toner to the image bearing element; a drive source configured to cause a driving force to operate the development device; and a clutch mechanism configured to intermittently transmit the driving force from the drive source to the development device, wherein the clutch mechanism includes: a support plate formed with a through-hole; an input element rotatably mounted on the support plate, the driving force from the drive source being input to the input element; an output element arranged between the support plate and the input element and mounted on the support plate so as to rotate upon receiving the driving force from the input element; a first elastic member arranged between the input element and the output element and configured to bias the output element toward the support plate; a first member arranged between the output element and the support plate and including a first slide surface and a sliding arm inserted through the through-hole; and a second member configured to accommodate the first member and including a second slide surface confronting the first slide surface, wherein insertion of the sliding arm through the through-hole allows the first member to approach and move apart from the support plate, when the second member is at a first rotational position where the second member accommodates the first member, the first elastic member moves the output element apart from the input element to cut off transmission of the driving force from the input element to the output element, and when the second member rotates from the first rotational position to a second rotational position so that the second slide surface moves toward the first slide surface, the first member pushed out from the second member by the first slide surface and the second slide surface presses the output element against the input element, so that the output element outputs the driving force transmitted from the input element.

BRIEF DESCRIPTION OF THE DRAWINGS

FIG. 4A is a schematic diagram showing operation of a second elastic member.

FIG. 4B is a schematic diagram showing the operation of the second elastic member.

FIG. 5A is a schematic diagram showing operation of a first member for a second member.

FIG. 5B is a schematic diagram showing the operation of the first member for the second member.

FIG. 7A is a perspective diagram showing a positional relationship between a main arm and a switch of the clutch mechanism shown in FIG. 6.

FIG. 7B is a perspective diagram showing the positional relationship between the main arm and the switch of the clutch mechanism shown in FIG. 6.

FIG. 10A is a diagram showing the clutch mechanism at a switching timing when the signal from the switch is altered between a higher voltage level and a lower voltage level.

FIG. 10B is an exploded diagram showing a positional relationship between the first member and the second member of the clutch mechanism shown in FIG. 10A.

FIG. 10C is a diagram showing output signals from the signal generator when the main arm of the clutch mechanism shown in FIG. 10A is rotated in a direction to press the switch button.

FIG. 10D is a diagram showing the clutch mechanism with the second member reached the second rotational position.

FIG. 10E is an exploded diagram showing the positional relationship between the first member and the second member of the clutch mechanism shown in FIG. 10D.

FIG. 11A is a diagram showing the clutch mechanism at a switching timing when the signal from the switch is altered between a higher voltage level and a lower voltage level.

FIG. 11B is an exploded diagram showing the positional relationship between the first member and the second member of the clutch mechanism shown in FIG. 11A.

FIG. 11C is a diagram showing the output signals from the signal generator when the main arm of the clutch mechanism shown in FIG. 11A is rotated in the direction apart from the switch button.

FIG. 11D is a diagram showing the clutch mechanism with the second member reached the first rotational position.

FIG. 11E is an exploded diagram showing the positional relationship between the first member and the second member of the clutch mechanism shown in FIG. 11D.

DETAILED DESCRIPTION OF THE PREFERRED EMBODIMENTS

Various embodiments of a clutch mechanism and an image forming apparatus exemplified as a processing device are now described with reference to the accompanying drawings. It should be noted that directional terms such as "up," "down," "left" and "right" hereinafter are used only for clarifying the description, and are not intended to limit principle to be disclosed. Term "sheet" as used in the following description refers to copy paper, tracing paper, cardboard, OHP sheet and other sheet materials on which an image may be formed. Term "processing device" as used in the following description refers to a given device configured to perform a given process by using a driving force intermittently transmitted from a drive source. In the following description, an image forming apparatus for performing image forming process on the "sheet" is exemplified as the processing device. Alternatively, the processing device may be a device configured to perform transport processing for objects, a device configured to perform cutting process for objects, a device configured to perform perforation process to objects or a device configured to perform other arbitrary process to objects.

First Embodiment

Figure 1:
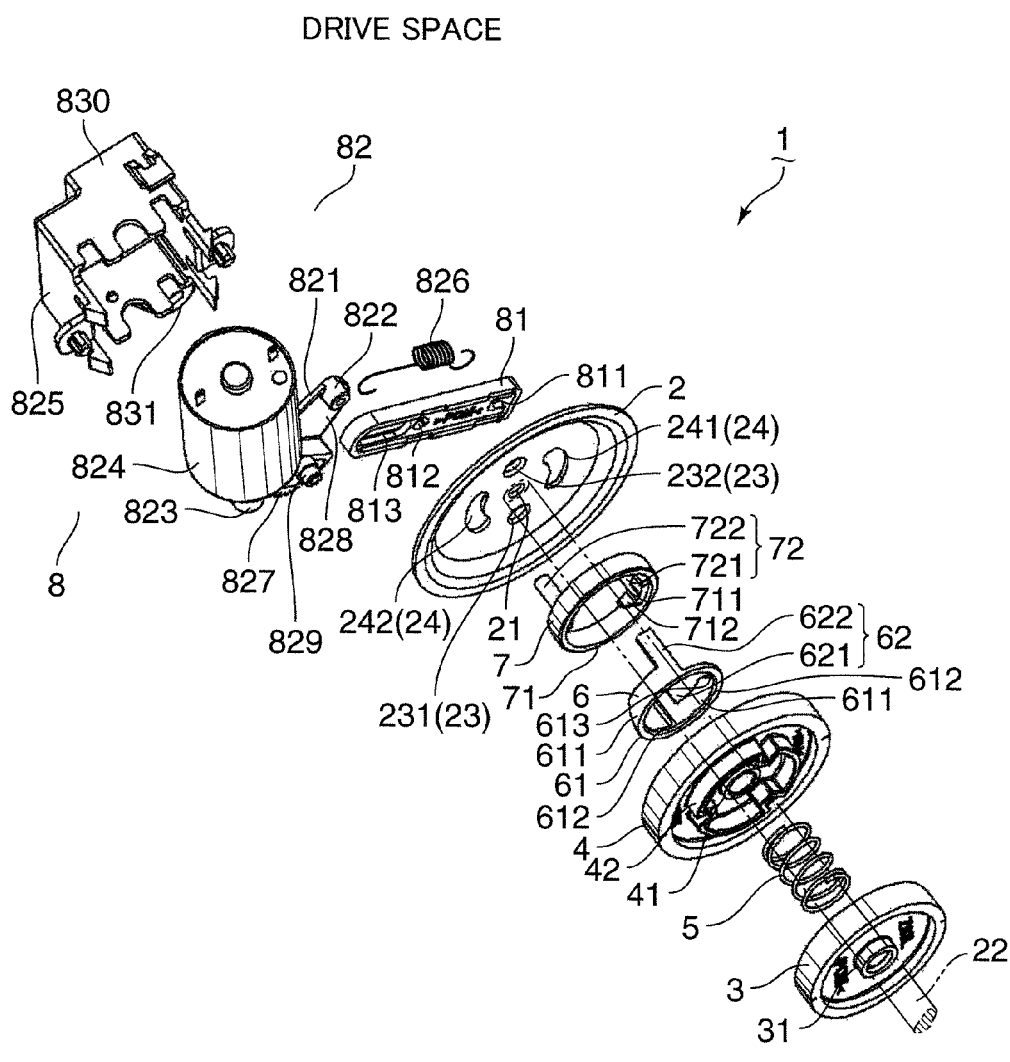
FIG. 1 is an exploded perspective diagram of a clutch mechanism according to a first embodiment.
Figure 2:
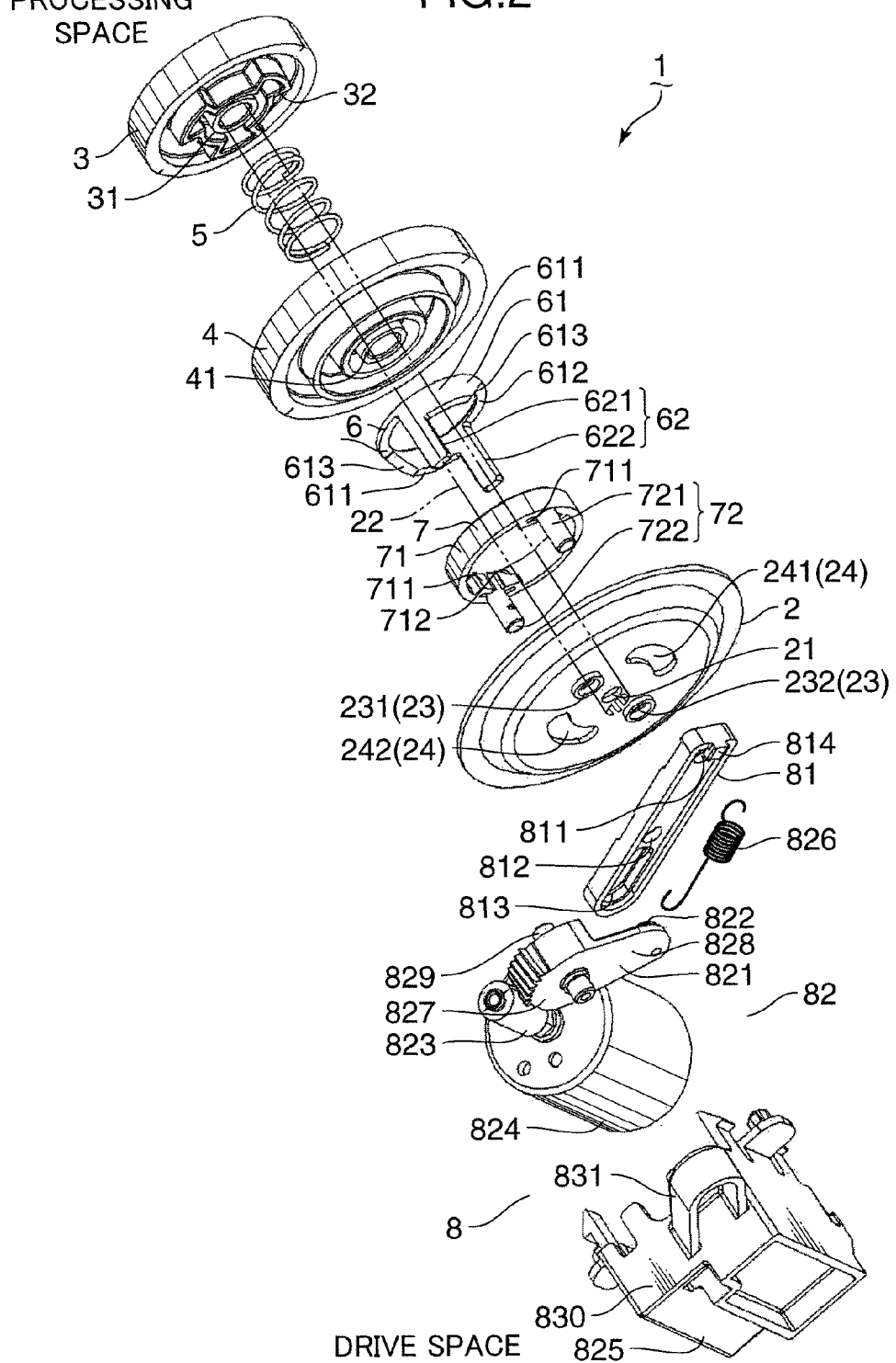
FIG. 2 is an exploded perspective diagram of the clutch mechanism according to the first embodiment.

FIGS. 1 and 2 are exploded perspective diagrams of a clutch mechanism according to a first embodiment. The clutch mechanism in FIG. 2 is depicted from a different direction from the clutch mechanism shown in FIG. 1. It should be noted that detailed structures and arrangements of the clutch mechanism shown in FIGS. 1 and 2 are depicted for expressly describing principles of the clutch mechanism without any limiting manner.

The clutch mechanism 1 comprises a discoid support plate 2. The support plate 2 is fixed to a mounting plate to which various types of equipment in a housing of a processing device (for example, an image forming apparatus) configured to perform a given process is mounted. The clutch mechanism 1 transmits a driving force to the various types of equipment mounted on the mounting plate to perform processing operations. The support plate 2 may be arranged at a boundary between the processing space where the various types of equipment are mainly arranged and a drive space where drive equipment for operating the various types of equipment is mainly mounted.

The clutch mechanism 1 further comprises an input gear 3 arranged in the processing space. The input gear 3 is used as an input element to which a driving force from a drive source such as a motor (not shown) is input.

The clutch mechanism 1 further comprises an output gear 4 arranged between the input gear 3 and the support plate 2. The output gear 4 is used as an output element configured to rotate upon receiving the driving force, which has been input to the input gear 3, to output the driving force.

The clutch mechanism 1 further comprises a first elastic member 5 arranged between the input gear 3 and the output gear 4. In this embodiment, a coil spring is used as the first elastic member 5. Alternatively, an arbitrary member configured to bias the output gear 4 toward the support plate 2 may also be used as the first elastic member 5.

The clutch mechanism 1 further comprises substantially annular first and second members 6 and 7 which are arranged between the output gear 4 and the support plate 2. The first member 6 is accommodated in the second member 7.

The substantially discoid support plate 2 is hollowed toward the drive space side. The first member 6 and the second member 7 are accommodated in the support plate 2. A through-hole 21 is formed at a substantially center of the support plate 2. A virgulate support shaft 22 (shown with a chain line in FIGS. 1 and 2) is fixed to the through-hole 21. It should be noted that the support shaft 22 shown in FIGS. 1 and 2 is drawn to be more elongated than it is, in order to clarify connection with respective constituent elements.

The support shaft 22 extends in an orthogonal direction with respect to the support plate 2 in the processing space. The support shaft 22 extends through the annular first and second members 6 and 7 and fits into a boss 41 formed at a center of the output gear 4 and a boss 31 formed at a center of the input gear 3. The first elastic member 5 is wound around the support shaft 22 between the input gear 3 and the output gear 4.

The input gear 3 is rotatably mounted on the support shaft 22. Preferably, the input gear 3 mounted on the support shaft 22 does not move in a longitudinal direction of the support shaft 22. On the other hand, the output gear 4 mounted on the support shaft 22 may move in the longitudinal direction of the support shaft 22 and rotate around the support shaft 22.

The support plate 2 is formed with a through-hole 23 for supporting the first member 6 and an arc-shaped slit 24 for preventing interference between the second member 7 and the support plate 2. The through-hole 23 includes a first through-hole 231 and a second through-hole 232. The slit 24 includes a first slit 241 and a second slit 242. A boss protruding toward the drive space side is formed around the first through-hole 231 and the second through-hole 232. The first through-hole 231 and the second through-hole 232 are point symmetric with respect to the through-hole 21. Similarly, the first slit 241 and the second slit 242 are also point symmetric with respect to the through-hole 21. Moreover, the through-hole 23 and the slit 24 are concentrically formed on the support plate 2 at an approximately 90° pitch.

The first member 6 includes a first annular part 61 formed in a substantially annular shape and a sliding arm 62 extending from the first annular part 61 toward the support plate 2. The sliding arm 62 includes a first sliding arm 621 inserted through the first through-hole 231 and a second sliding arm 622 inserted through the second through-hole 232. When the sliding arm 62 is inserted through the through-hole 23, the first member 6 is mounted on the support plate 2. The sliding arm 62 is complementary to the through-hole 23. Accordingly, insertion of the sliding arm 62 through the through-hole 23 prevents rotation of the first member 6 with respect to the support plate 2 while the first member 6 guided by the through-hole 23 and the sliding arm 62 is allowed to approach and move away from the support plate 2.

The second member 7 includes a second annular part 71 formed in a substantially annular shape and a movable arm 72 extending from the second annular part 71 toward the support plate 2. The movable arm 72 includes a first movable arm 721 inserted through the first slit 241 and a second movable arm 722 inserted through the second slit 242. When the movable arm 72 is inserted through the slit 24, the second member 7 is rotatably mounted on the support plate 2. It should be noted that an arc length of the first slit 241 and/or the second slit 242 is defined so as to cover a rotational range of the second member 7, which is defined based on an arc length formed with the gear teeth of the gear 827 described later. The second member 7 supported by a cylindrical portion located around the boss 41 of the output gear 4 rotates at a predetermined range (range between a first rotational position and a second rotational position, which will be described later in detail) with respect to the support plate 2. The tips of the sliding and movable arms 62 and 72 extend through the support plate 2 to appear in the drive space.

The clutch mechanism 1 further comprises a link mechanism 8 arranged on the drive space side. The link mechanism 8 is connected to the second member 7 which rotates between the first rotational position and the second rotational position.

The link mechanism 8 includes a substantially flat bar-like main arm 81. A first connection hole 811 is formed at a tip of the main arm 81. A second connection hole 812 is formed at an intermediate position in a longitudinal direction of the main arm 81. The tip of the first movable arm 721 of the second member 7 extending through the support plate 2 is inserted through the first connection hole 811. The tip of the second movable arm 722 of the second member 7 extending through the support plate 2 is inserted through the second connection hole 812. The support plate 2 is thereby sandwiched between the second member 7 and the main arm 81. A guide slit 813 extending in a longitudinal direction of the main arm 81 is formed at a base part of the main arm 81.

The link mechanism 8 further includes a swing mechanism 82. The swing mechanism 82 includes a substantially sectored swing member 821, a cylindrical connection piece 822 connected to a tip of the swing member 821, an swing drive source 824 (for example, a motor) with a gear element 823 (for example, a worm gear) which engages with gear teeth (for example, helical gear) formed along a circumferential surface of a base part of the swing member 821, and a housing 825 surrounding the swing drive source 824. The connection piece 822 extending toward the support plate 2 is inserted through the guide slit 813 of the main arm 81. A protrusion 814 protruding in a direction away from the support plate 2 is formed at the tip of the main arm 81.

The swing mechanism 82 further includes a second elastic member 826 (for example, a coil spring). A tip end of the second elastic member 826 is curved and hooked with the protrusion 814 of the main arm 81. A base end of the second elastic member 826 is curved and hooked with the connection piece 822 inserted through the guide slit 813 of the main arm 81.

The swing member 821 includes the circumferential surface formed with the gear teeth. The circumferential surface is exemplified as a gear 827. The swing member 821 includes, in addition to the substantially semicircular gear 827, a connecting part 828 extending from the gear 827 toward the connection piece 822. The swing member 821 further includes a rotating shaft 829 formed at a curvature center of the gear 827.

The housing 825 includes a box 830 surrounding the swing drive source 824, and a mounting arm 831 extending from an outer surface of the box 830. One end of the rotating shaft 829 is rotatably connected to the mounting arm 831. The other end of the rotating shaft 829 is rotatably mounted, for example, to a mounting plate (not shown) to which the support plate 2 is mounted.

Figure 3:
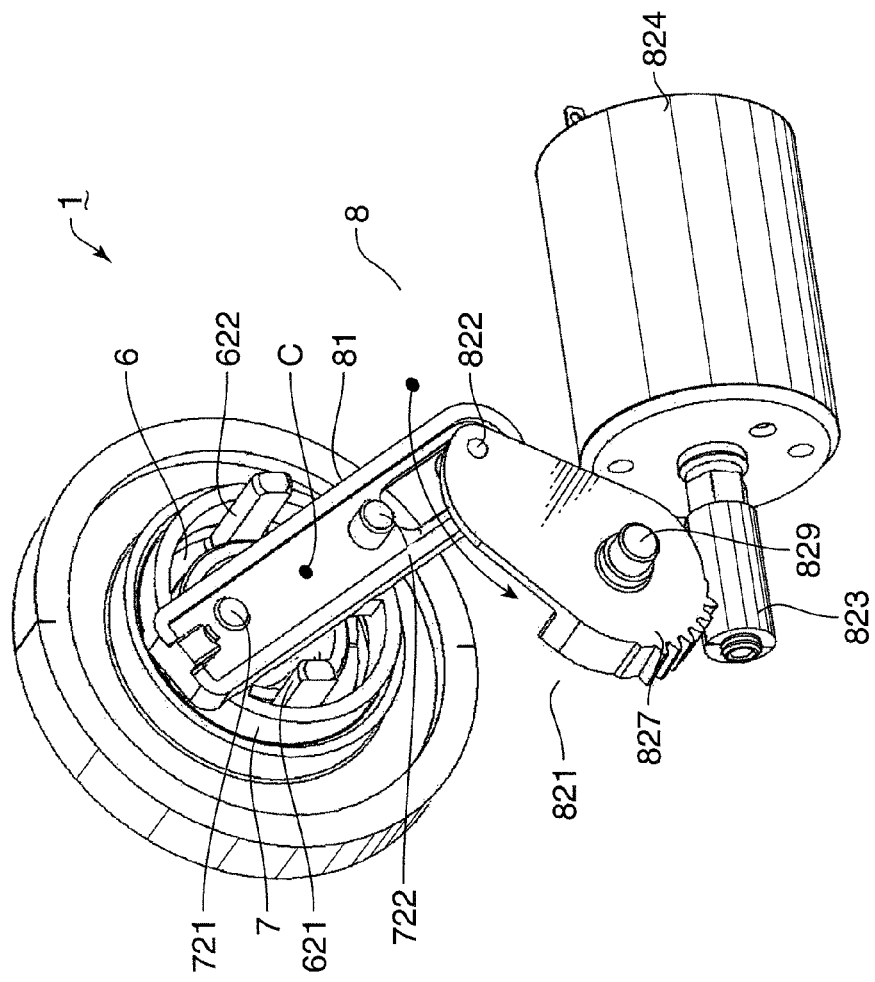
FIG. 3 is a perspective diagram of the clutch mechanism shown from a side of a link mechanism.

FIG. 3 is a perspective diagram of the clutch mechanism 1. It should be noted that FIG. 3 does not show the support plate 2, the housing 825 and the second elastic member 826. The operation of the link mechanism 8 is now described with reference to FIGS. 1 to 3.

As the swing drive source 824, for example, a bidirectional motor is preferably used. A gear element 823 is mounted on a rotating shaft of the swing drive source 824. As the gear element 823, for example, a worm gear is preferably used. The gear element 823 engages with the gear teeth formed on the circumferential surface of the gear 827 of the swing member 821. When the swing drive source 824 is subject to normal rotation or reverse rotation, the swing driving force (force for swing the main arm 81) is transmitted to the swing member 821 via the gear element 823. The gear 827 of the swing member 821 thereby rotates around the rotating shaft 829. Since a center angle of the circumferential surface of the gear 827 formed with the gear teeth is less than a central angle of a complete circle (360°), the arc length formed with the gear teeth of the gear 827 defines a range of a rotational angle of the swing member 821. Accordingly, the swing drive source 824 reciprocally rotates the swing member 821 within the range of the arc length formed with the gear teeth of the gear 827.

When the gear 827 of the swing member 821 rotates around the rotating shaft 829, the connection piece 822 apart from the rotating shaft 829 moves in a circular trajectory. Meanwhile, the connection piece 822 guided by the guide slit 813 formed along the longitudinal direction of the main arm 81 horizontally moves. The base part of the main arm 81 connected to the connection piece 822 moves horizontally according to the movement of the connection piece 822. As described above, the main arm 81 is connected to the first and second movable arms 721 and 722 of the second member 7. Accordingly, the main arm 81 swings around a swing axis C which is defined as an intermediate position between the first movable arm 721 and the second movable arm 722. The swing axis C simultaneously becomes a rotational axis of the second member 7. The swing member 821 reciprocally rotates around the rotating shaft 829 (rotational axis) away from the swing axis C. While the main arm 81 swings around the swing axis C, the connection piece 822 reciprocates on a line from the connection piece 822 to the swing axis C along the guide slit 813.

As a result of the main arm 81 swinging around the swing axis C, the second member 7 rotates within a predetermined range (range of the rotation angle of the swing member 821 defined by the arc length formed with the gear teeth of the gear 827). While the second member 7 rotates, the first movable arm 721 and the second movable arm 722 move in arc-shaped trajectories along the first slit 241 and the second slit 242, respectively.

FIGS. 4A and 4B show operation of the second elastic member 826. FIG. 4A schematically shows the link mechanism 8 when the gear teeth existing on one end among the gear teeth of the gear 827 engage with the gear element 823. FIG. 4B schematically shows the link mechanism 8 when the gear teeth existing on the other end among the gear teeth of the gear 827 engage with the gear element 823. The operation of the link mechanism 8 is further described with reference to FIGS. 1 to 4B. It should be noted that a rotational position of the swing member 821 shown in FIG. 4A is exemplified as the first rotational position. A rotational position of the swing member 821 shown in FIG. 4B is exemplified as the second rotational position.

The second elastic member 826 arranged between the swing member 821 and the main arm 81 stretches between the connection piece 822 and the protrusion 814 of the main arm 81. Accordingly, a force F toward the swing axis C of the main arm 81 shown in FIG. 3 works on the connection piece 822 connected to the base end of the second elastic member 826. The force F causes momentum M around the rotating shaft 829 to work on the swing member 821. The momentum M works on the engagement between the gear teeth of the gear 827 and the gear element 823 so as to urge the swing member 821 to the second rotational position when the swing member 821 is in the first rotational position. The momentum M works on the engagement between the gear teeth of the gear 827 and the gear element 823 so as to urge the swing member 821 to the first rotational position when the swing member 821 is in the second rotational position. Consequently, the rotation of the swing member 821 associated with the bidirectional rotation of the swing drive source 824 and the swing of the main arm 81 may be smoothly performed.

Operation of the first member 6 associated with the rotation of the second member 7 caused by the swing of the main arm 81 is now described with reference to FIGS. 1 to 3 once again.

The first sliding arm 621 and the second sliding arm 622 of the first member 6 are inserted through the first through-hole 231 and the second through-hole 232 of the support plate 2. Accordingly, even while the second member 7 is rotating, the first member 6 accommodated in the second member 7 does not rotate. As shown in FIGS. 1 and 2, the first annular part 61 of the first member 6 includes a pair of long walls 611, which is thick in the longitudinal direction of the support shaft 22, and a pair of connecting arc portions 612 connected to the paired long walls 611. The first sliding arm 621 and the second sliding arm 622 extend from one end of the paired long walls 611, respectively. First slide surface 613 inclined with respect to a longitudinal axis of the support shaft 22 are formed at the other ends of the paired long walls 611, respectively.

Paired protrusions 711, which look like a substantially trapezoidal column, respectively, are formed on an inner circumferential surface in the second annular part 71 of the second member 7. The paired protrusions 711 are arranged between the paired long walls 611 while the first member 6 is accommodated in the second member 7. A second slide surface 712 is formed at edges of the protrusions 711.

FIGS. 5A and 5B are development diagrams of the first member 6 and the second member 7. FIG. 5A shows a positional relationship between the first member 6 and the second member 7 when the second member 7 is in the first rotational position. FIG. 5B shows the positional relationship between the first member 6 and the second member 7 when the second member 7 is in the second rotational position. The operation of the first member 6 associated with the rotation of the second member 7 is further described with reference to FIGS. 1, 2, 5A and 5B.

The second member 7 in the first rotational position accommodates the first member 6. Accordingly, the first slide surface 613 of the first member 6 confronts and contacts the second slide surface 712 of the second member 7. When the second member 7 rotates so that the second slide surface 712 moves toward the first slide surface 613, as described above, the first member 6, of which rotation is restricted by the sliding arm 62, is pushed to move out from the second member 7 by the first slide surface 613 and the second slide surface 712. It should be noted that even when second member 7 after arrival at the second rotational position fully pushes out the first member 6, the sliding arm 62 of the first member 6 is still inserted through the through-hole 23 of the support plate 2. Accordingly, the first member 6 is less likely to dropping off the clutch mechanism 1.

When the second member 7 rotates from the first rotational position toward the second rotational position, the first member 6 is pushed inside the second member 7 due to a biasing force of the first elastic member 5. Consequently, the first member 6 is repeatedly pushed in and out of the second member 7 according normal and reverse rotations of the swing drive source 824.

As shown in FIGS. 1 and 2, the output gear 4 adjacent to the first member 6 is apart from the input gear 3 by the first elastic member 5 while the first member 6 is accommodated in the second member 7. Accordingly, when the second member 7 is in the first rotational position, the driving force transmitted from the drive source to the input gear 3 is not transmitted to the output gear 4, so that the output gear 4 does not output the driving force. When the second member 7 rotated to the second rotational position pushes out the first member 6, the first member 6 presses the output gear 4 against the input gear 3.

As shown in FIGS. 1 and 2, the input gear 3 includes a protrusion 32 forming three protruding spaces which radially extends. The protrusions 32 protrude toward the output gear 4. The output gear 4 includes a protrusion 42 forming a complementary inner space with the protrusion 32 of the input gear 3. The protrusion 42 protrudes toward the input gear 3. As described above, when the output gear 4 is pressed against the input gear 3, the protrusion 42 of the output gear 4 engages with the protrusion 32 of the input gear 3. Consequently, the driving force from the drive source is transmitted from the input gear 3 toward the output gear 4, so that the driving force is output from the output gear 4.

Second Embodiment

Figure 6:
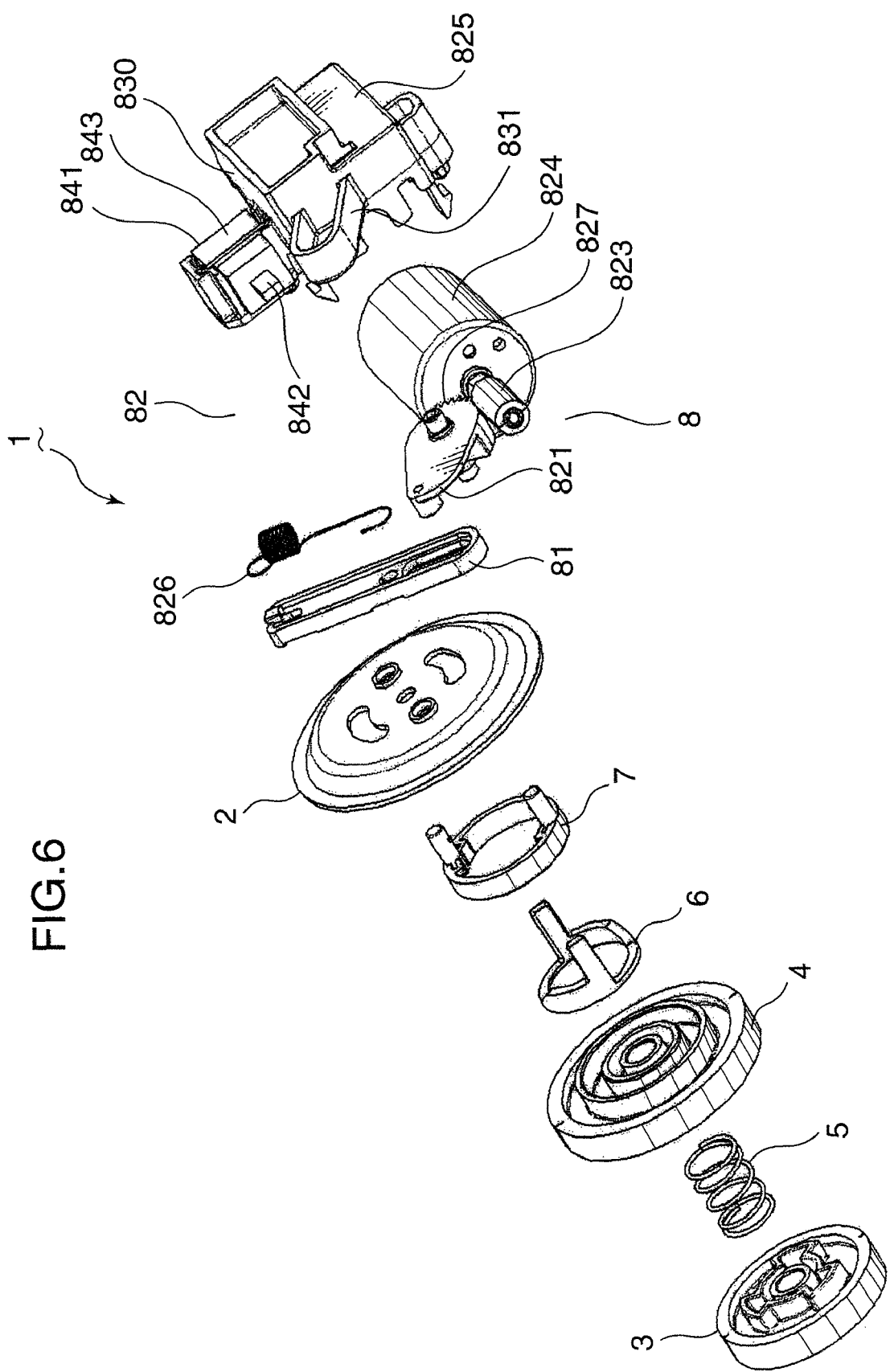
FIG. 6 is an exploded perspective diagram of the clutch mechanism according to the second embodiment.

FIG. 6 is an exploded perspective diagram of the clutch mechanism 1 according to the second embodiment. Differences of the clutch mechanism 1 according to the second embodiment from the clutch mechanism 1 according to the first embodiment described in the context of FIGS. 1 to 5B are now explained, and descriptions of common elements are omitted. It should be noted that elements of the clutch mechanism 1 according to the second embodiment which are common or similar to the elements of the clutch mechanism 1 according to the first embodiment are given the same reference number as those used in the description in the context of FIGS. 1 to 5B.

The clutch mechanism 1 according to the second embodiment includes a controller configured to control a swing drive source 824 for causing the swing member 821 to reciprocate and rotate within a range of an arc length formed with gear teeth of a gear 827. The controller includes a switch 841, which may be mounted, for example, as shown in FIG. 6, on a box 830 of the housing 825.

FIGS. 7A and 7B are perspective diagrams showing a positional relationship between the switch 841 and the main arm 81. FIG. 7A is a perspective diagram of the clutch mechanism 1 of which a second member 7 in a first rotational position. FIG. 7B is a perspective diagram of the clutch mechanism 1 of which the second member 7 in a second rotational position. The positional relationship between the switch 841 and the main arm 81 is now described with reference to FIGS. 6 to 7B. It should be noted that, in FIGS. 7A and 7B, the support plate 2 is omitted for clarification.

The switch 841 includes a button 842 to be operated for turning the switch 841 ON/OFF. The button 842 is configured to move inside and outside the housing 843 accommodating electronic device of the switch 841. At least one of the main arm 81 and the swing member 821 is arranged to press the button 842 while the second member 7 rotates between the first rotational position and the second rotational position. In the clutch mechanism 1 shown in FIGS. 7A and 7B, if the second member 7 exists in the first rotational position, the main arm 81 is apart from the button 842, so that the button 842 protrudes from the housing 843. Moreover, if the second member 7 exists in the second rotational position, the main arm 81 presses and pushes the button 842 into the housing 843.

Figure 8:
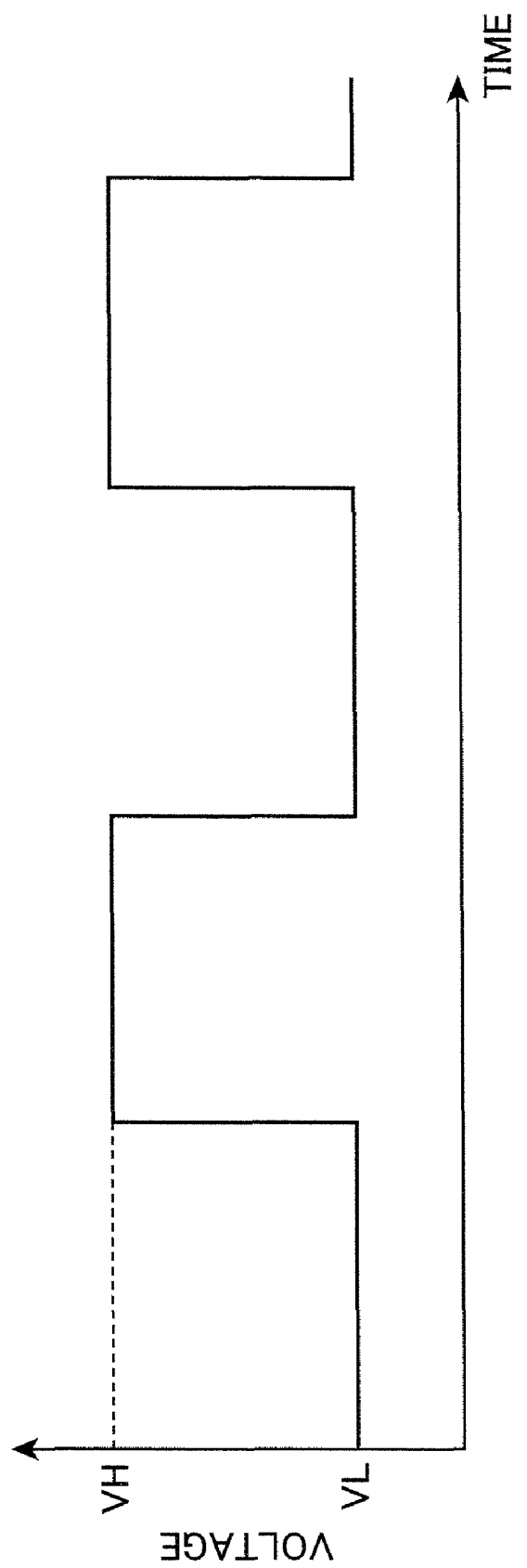
FIG. 8 is a diagram schematically showing output signals from the switch of the clutch mechanism shown in FIG. 6.

FIG. 8 is a graph showing an output signal from the switch 841. The output from the switch 841 is now described with reference to FIGS. 7A to 8.

As shown in FIG. 8, while the button 842 is pressed, the switch 841 outputs a higher voltage level VH of the signal. While the button 842 is not pressed, the switch 841 outputs a lower voltage level VL of the signal. Alternatively, the switch 841 may output the higher voltage VH of the signal while the button 842 is not pressed, and the switch 841 may output the lower voltage level VL of the signal while the button 842 is pressed. Consequently, the button 842 is used for switching the switch 841.

Figure 9:
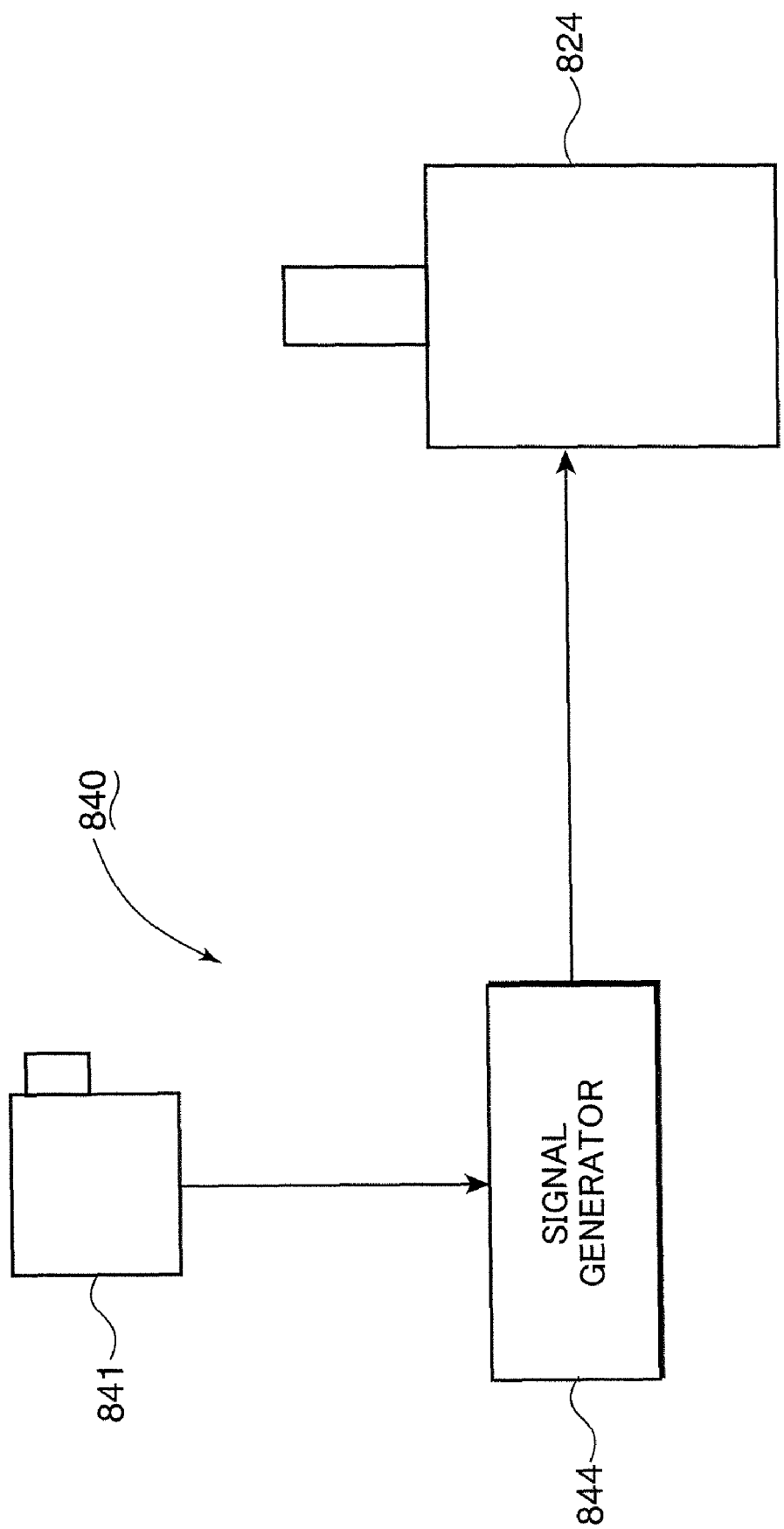
FIG. 9 is a block diagram schematically showing a controller of the clutch mechanism shown in FIG. 6.

FIG. 9 is a block diagram schematically showing a configuration of the controller. The controller is now described with reference to FIGS. 7A to 9.

The controller 840 includes a signal generator 844 in addition to the switch 841. The signal output from the switch 841 is input to the signal generator 844. The signal generator 844 determines switching of the switch between ON-mode and OFF-mode based on the change in the voltage level of the signal from the switch 841. The signal generator 844 further selectively outputs a first signal or a second signal to the swing drive source 824 for applying different control to the swing drive source 824 based on the switching operation of the switch 841 between the ON-mode and the OFF-mode. The swing drive source 824 may also drive and rotate the swing member 821 in a direction (first direction) where the second member 7 is rotated from the first rotational position to the second rotational position upon receiving the first signal. In the foregoing case, the swing drive source 824 drives and rotate the swing member 821 in a direction (second direction) where the second member 7 is rotated from the second rotational position to the first rotational position upon receiving the second signal. Alternatively, the swing drive source 824 may also drive and rotate the swing member 821 in the direction (first direction) where the second member 7 is rotated from the second rotational position to the first rotational position upon receiving the first signal. In the foregoing case, the swing drive source 824 drives and rotate the swing member 821 in the direction (second direction) where the second member 7 is rotated from the first rotational position to the second rotational position upon receiving the second signal.

FIGS. 10A to 11E are diagrams showing control of the signal generator 844 for the swing drive source 824. FIG. 10A and FIG. 11A show the clutch mechanism 1 at the switching timing when the signal of the switch 841 is switched between the high voltage level and the low voltage level. FIG. 10B and FIG. 11B are development diagrams showing the positional relationship between the first member 6 and the second member 7 of the clutch mechanism 1 shown in FIGS. 10A and 11A, respectively. FIG. 10C shows the output signal from the signal generator 844 when the main arm 81 of the clutch mechanism 1 shown in FIG. 10A rotates in the direction to press the button 842 of the switch 841 (i.e. the direction where the second member 7 rotates toward the second rotational position). FIG. 11C shows the output signal from the signal generator 844 when the main arm 81 of the clutch mechanism 1 shown in FIG. 11A rotates in the direction apart from the button 842 of the switch 841 (i.e. the direction where the second member 7 rotates toward the first rotational position). FIG. 10D shows the clutch mechanism 1, of which the second member 7 reaches the second rotational position. FIG. 10E is a development diagram showing the positional relationship between the first member 6 and the second member 7 of the clutch mechanism 1 shown in FIG. 10D. FIG. 11D shows the clutch mechanism 1, of which the second member 7 reaches the first rotational position. FIG. 11E is a development diagram showing the positional relationship between the first member 6 and the second member 7 of the clutch mechanism 1 shown in FIG. 11D. The control by the signal generator 844 for the swing drive source 824 is now described with reference to FIG. 6 and FIGS. 9 to 11E.

The switch 841 is mounted to switch the output between the high voltage level VH and the low voltage level VL at time TS (refer to FIGS. 10C, 11C) when the sliding between the first slide surface 613 and the second slide surface 712 finishes and/or starts (refer to FIG. 10B, 11B). It should be noted that the present embodiment is not limited to the disposition of the switch 841 shown in FIGS. 10A to 11E. The switch 841 may be disposed at an arbitrary position which allows the switch 841 to switch the voltage level (i.e. ON/OFF switching) while the second member 7 rotates between the first rotational position and the second rotational position.

As shown in FIGS. 10A to 10E, when the main arm 81 moves in the direction to press the button 842 of the switch 841 based on the output signal from the switch 841, the signal generator 844 receiving the signal input from the switch 841 detects that the potential of the input signal changes from the low voltage level VL to the high voltage level VH. The signal generator 844 measures an elapsed period from the switch time TS using a timing element such as a timer based on the time in which a potential of the input signal changed from the low voltage level VL to the high voltage level VH (i.e. the switch time TS). After a predetermined period (first period) passes from the switch time TS, the signal generator 844 controls the swing drive source 824 to stop the rotating operation of the main arm 81 in the direction to press the button 842 of the switch 841 (i.e. the rotating operation of the second member 7 toward the second rotational position). The aforementioned first period is appropriately determined on the basis of the arc length formed with the gear teeth of the gear 827 so that the engagement between the gear element 823 and the gear 827 are not disengaged so much. Subsequently, the signal generator 844 outputs a drive signal (first signal or second signal) to the swing drive source 824 for rotating the main arm 81 in the direction apart from the button 842 of the switch 841 (i.e. so that the second member 7 is rotated toward the first rotational position). As described above, since the control by the controller 840 is less likely to cause larger disengagement between the gear element 823 and the gear 827, the swing drive source 824 operates the main arm 81 to rotate in the direction apart from the button 842 of the switch 841, which leads to less abnormal noise arising from re-engagement between the gear element 823 and the gear 827.

As shown in FIGS. 11A to 11E, while the second member 7 rotates toward the first rotational position, the main arm 81 moves in the direction apart from the button 842. The signal output from the switch 841 changes from the high voltage level VH to the low voltage level VL when the button 842 is released from the press of the main arm 81. The signal generator 844 receiving the signal input from the switch 841 detects a change in a potential of the input signal from the high voltage level VH to the low voltage level VL. The signal generator 844 measures an elapsed period from the switch time TS using the timing element such as the timer based on the time in which the potential of the input signal changed from the high voltage level VH to the low voltage level VL (i.e. the switch time TS). After a predetermined period (second period) passes from the switch time TS, the signal generator 844 controls the swing drive source 824 to stop the rotating operation of the main arm 81 in the direction apart from the button 842 of the switch 841 (i.e. the rotating operation of the second member 7 toward the first rotational position). The aforementioned second period is appropriately determined on the basis of the arc length formed with the gear teeth of the gear 827 so that larger disengagement between the gear element 823 and the gear 827 is less likely to occur. Subsequently, the signal generator 844 outputs a drive signal (second signal or first signal) to the swing drive source 824 for rotating the main arm 81 in the direction to press the button 842 of the switch 841 (i.e. so that the second member 7 rotates toward the second rotational position). As described above, since the control by the controller 840 is less likely to cause larger disengagement between the gear element 823 and the gear 827, the swing drive source 824 operates the main arm 81 to rotate in the direction to press the button 842 of the switch 841, which leads to less abnormal noise arising from re-engagement between the gear element 823 and the gear 827.

Figure 12:
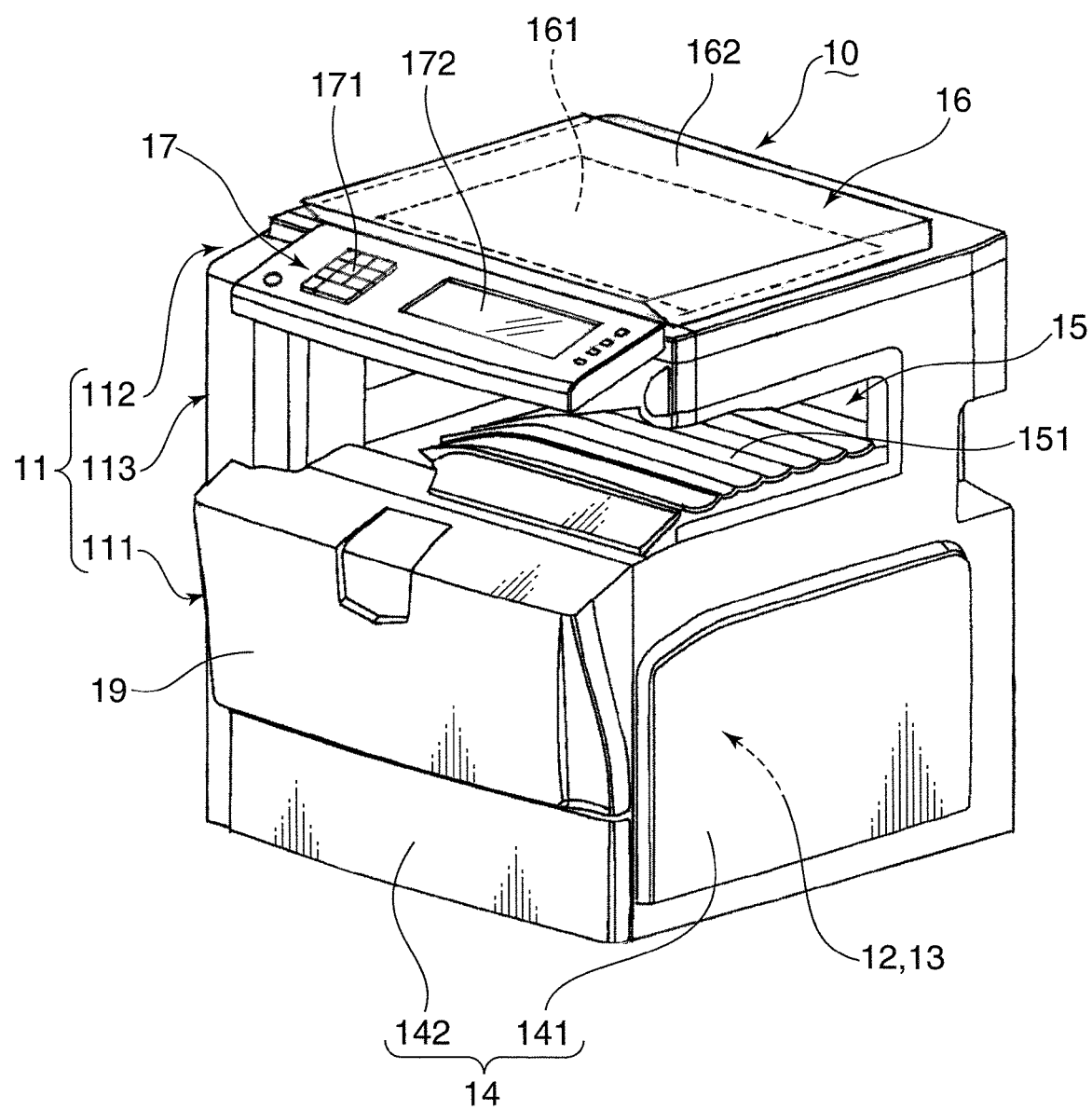
FIG. 12 is a perspective diagram of the image forming apparatus to which the clutch mechanism is built therein.

FIG. 12 is a perspective diagram of an image forming apparatus exemplified as a processing device equipped with the clutch mechanism 1 according to the first or second embodiment described with reference to FIGS. 1 to 11E. The image forming apparatus shown in FIG. 12 is an inner discharge tray-type of a copy machine. Alternatively, the image forming apparatus may be a printer, a facsimile device, a multi-functional device comprising their functions or other devices configured to form a toner image on a sheet.

The image forming apparatus 10 comprises a substantially rectangular housing 11, an image forming unit 12 and a fixation unit 13 which are built into the housing 11, a storage unit 14 configured to store sheets in the housing 11, a discharge section formed at a center of the housing 11, an image reader 16 provided at an upper part of the housing 11, and an operating unit 17. The housing 11 includes a substantially rectangular lower housing 111 configured to accommodate the image forming unit 12, the fixation unit 13 and the storage unit 14, a substantially flat and rectangular upper housing 112 equipped with the image reader 16 and the operating unit 17, and a joint housing 113, which looks like substantially L-shaped in a plane view, configured to joint the lower housing 111 with the upper housing 112. The joint housing 113 extends along left and rear edges of the housing 11. An upper surface of the lower housing 111, a lower surface of the upper housing 112 and a right surface of the joint housing 113 form the discharge section 15 hollowed inward.

The operating unit 17 forms a front portion of the upper housing 112. The operating unit 17 includes a numerical keypad 171, an LCD touch panel 172 and other operational keys. The operating unit 17 is configured to receive input of information concerning image forming process. A user may input, for example, a number of sheets to be printed through the numerical keypad 171 or print density through the LCD touch panel 172.

Figure 13:
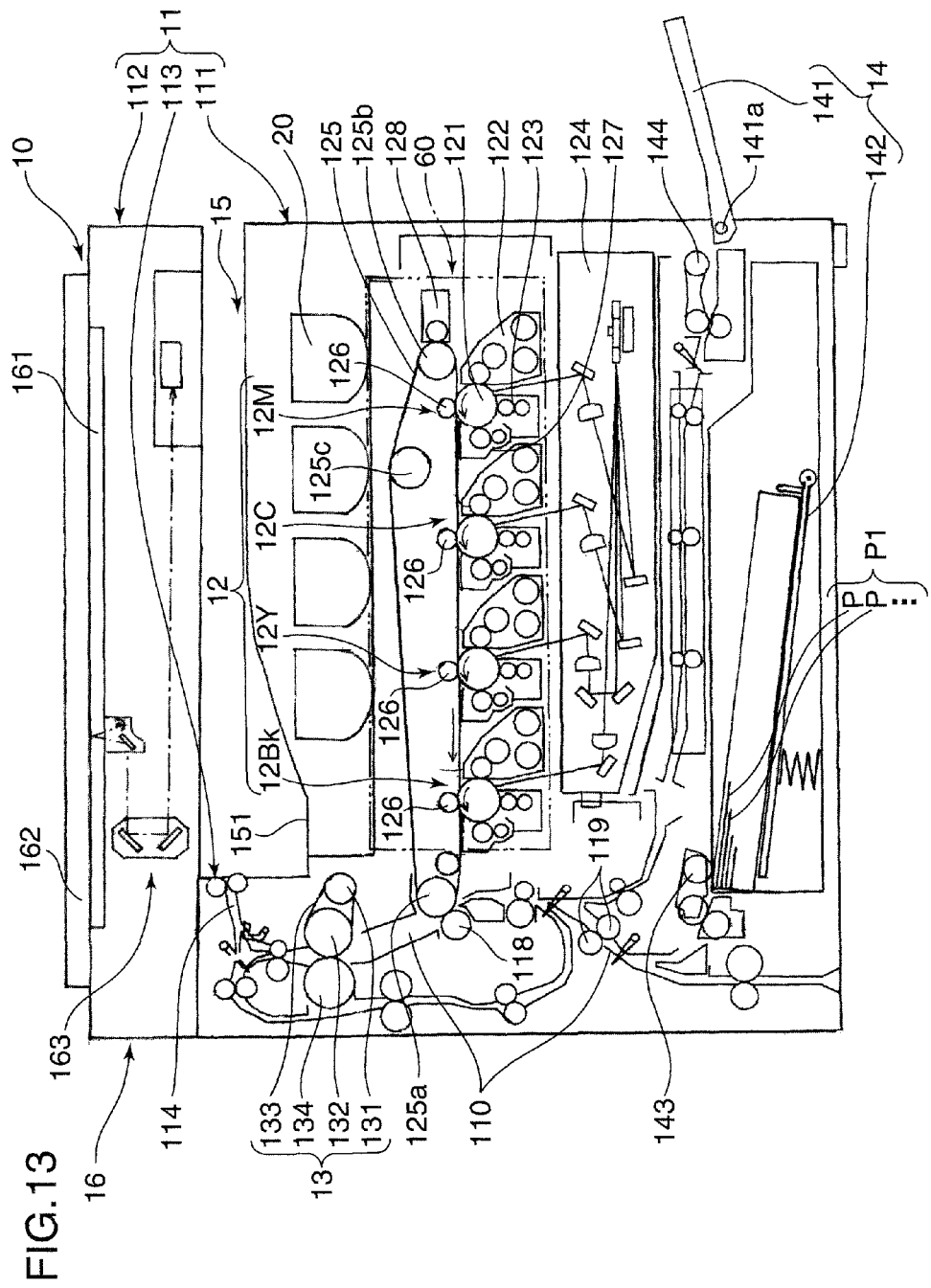
FIG. 13 is a schematic diagram showing an internal structure of the image forming apparatus shown in FIG. 12.

FIG. 13 schematically shows an internal structure of the image forming apparatus 10 shown in FIG. 12. The image forming apparatus 10 is further described with reference to FIGS. 12 and 13.

A user may cause the image forming apparatus 10 to read an image of an intended document through the image reader 16. The image reader 16 includes a contact glass 161 mounted on an upper surface of the upper housing 112, and a holding cover 162 configured to rotate over the contact glass 161. The user may also rotate the holding cover 162 upward to place the intended document on the contact glass 161. Subsequently, the user may rotate the holding cover 162 downward to press the document on the contact glass 161. The upper housing 112 is internally provided with a scanning mechanism 163. When the user operates the image forming apparatus 10, for example, with the operating unit 17, the scanning mechanism 163 scans and reads the image of the document on the contact glass 161. Analog information of the image read by the scanning mechanism 163 is converted into digital signals. The image forming apparatus 10 forms an image on the sheet P based on the digital signals.

The sheet P is fed from the storage unit 14. The storage unit 14 includes a cassette 142 configured to be detachably inserted into the lower housing 111, and a manual feed tray 141 rotatably mounted on a right surface of the lower housing 111. The cassette 142 is a substantially rectangular box. An upper part of the cassette 142 is open. A sheet pile P1 where sheets P are stacked is stored in the cassette 142. A pickup roller 143 is arranged above a left edge of the cassette 142. The left edge (leading edge) of the sheet pile P1 accommodated in the cassette 142 is lifted upward to come in contact with a pickup roller 143. The pickup roller 143 feeds sheets P one by one from the sheet pile P1 to a feeding path 110. A conveyance roller pair 119 provided midway of the feeding path 110 sends the sheet P to a secondary transcription nip formed between a secondary transcription roller 118 and an intermediate transcription belt 125, which are described later. It should be noted that the present embodiment uses one cassette 142. Alternatively, two or more stacked cassettes 142 may also be used as the storage unit 14.

A support shaft 141a is formed at a lower edge of the manual feed tray 141. The manual feed tray 141 mounted on the right surface of the lower housing 111 may rotate around the support shaft 141a. The manual feed tray 141 may turn between a close position where the manual feed tray 141 lies along the right surface of the lower housing 111 to close the paper feed port and an open position where the manual feed tray 141 protrudes rightward. The manual feed tray 141 in the open position may support the sheet P. A feed roller 144 sends the sheet P on the manual feed tray 141 to the secondary transcription nip formed between the secondary transcription roller 118 and the intermediate transcription belt 125, which are described later, built into the lower housing 111.

A vertically rotatable maintenance door 19 is mounted on a front wall of the lower housing 111. A user may open the maintenance door 19 to remove a sheet P in the lower housing 111, which is jammed after conveyance from the storage unit 14.

The image forming unit 12 forms a toner image on the sheet P sent from the storage unit 14. A magenta unit 12M configured to form a toner image with magenta toner, a cyan unit 12C configured to form a toner image with cyan toner, a yellow unit 12Y configured to form a toner image with yellow toner, and a black unit 12Bk configured to form a toner image with black toner are arranged above the cassette 142 in the lower housing 111. The magenta unit 12M, the cyan unit 12C, the yellow unit 12Y and the black unit 12Bk are sequentially arranged from right to left.

The units 12M, 12C, 12Y and 12Bk comprise a photoreceptor drum 121 and a development device 122 configured to supply toner to the photoreceptor drum 121, respectively. After an electrostatic latent image is formed on a circumferential surface of the photoreceptor drum 121, toner is supplied from the development device 122 to form a toner image (visible image) corresponding to the electrostatic latent image. In the present embodiment, the clutch mechanism 1 described with reference to FIGS. 1 to 11 intermittently transmits the driving force from the drive source to the development device 122. The development device 122 is used as a processing unit for performing toner supply process to the photoreceptor drum 121. Alternatively, if the clutch mechanism 1 is used in other processing devices, the processing devices to perform other process may be used as the processing unit.

The photoreceptor drum 121 in FIG. 13 rotates in the counterclockwise direction. The toner image formed on the photoreceptor drum 121 is transcribed to the intermediate transcription belt 125 which runs above the photoreceptor drum 121.

Four toner cartridges 20, which accommodate the magenta, cyan, yellow and black toner, respectively, are detachably mounted on the lower housing 111. These toner cartridges 20 are positioned between the intermediate transcription belt 125 and the discharge section 15. Toner supply ducts (not shown) extend from the toner cartridge 20 to the units 12M, 12C, 12Y, 12Bk, respectively. Toner is supplied to the units 12M, 12C, 12Y, 12Bk, respectively. In the present embodiment, one color selected from a group of the magenta toner, the cyan toner, the yellow toner and the black toner is selected as the first color, and one of other colors is used as the second color. Alternatively, two different arbitrary colors may be selected as the first color and the second color. In this embodiment, the development device 122 configured to supply one color selected from a group of the magenta toner, the cyan toner, the yellow toner and the black toner to the photoreceptor drum 121 is used as the first development device. The development device 122 configured to supply another color selected from a group of the magenta toner, the cyan toner, the yellow toner and the black toner to the photoreceptor drum 121 is used as the second development device. Alternatively, the development device 122 configured to supply two different arbitrary colors to an image bearing element such as the photoreceptor drum 121 may be used as the first development device and the second development device.

The image forming unit 12 further includes a charger 123 provided below the photoreceptor drum 121 of each unit 12M, 12C, 12Y, 12Bk, and an exposure device 124 provided below the charger 123. The charger 123 uniformly charges the circumferential surface of the photoreceptor drum 121. The exposure device 124 irradiates a laser beam onto the circumferential surface of the charged photoreceptor drum 121 based on the digital signals according to the read document. Consequently, an electrostatic latent image corresponding to color components of the document is formed on the circumferential surface of the photoreceptor drum 121 of each unit 12M, 12C, 12Y, 12Bk. Subsequently, the development device 122 supplies the toner to the circumferential surface of the photoreceptor drum 121, so that the toner is electrostatically adhered to the electrostatic latent image to form a toner image.

The intermediate transcription belt 125 above the photoreceptor drums 121 extends between a left drive roller 125a and a right idle roller 125b. A lower surface of the intermediate transcription belt 125 (which moves leftward) comes in contact with the circumferential surface of the photoreceptor drums 121. The outer peripheral surface of the intermediate transcription belt 125 is used as a surface for bearing the toner. First transcription rollers 126 are arranged above the photoreceptor drums 121, respectively. The intermediate transcription belt 125 pressed against the circumferential surface of the photoreceptor drum 121 by the first transcription roller 126 runs between the drive roller 125a and the idle roller 125b. A tension roller 125c is arranged between the drive roller 125a and the idle roller 125b. The tension roller 125c is biased upward, for example, with a biasing member (not shown). The tension roller 125c pushed upward with the biasing member causes a tensile force to the intermediate transcription belt 125, which rises up near the idle roller 125 to form a mountain-shaped profile.

While the intermediate transcription belt 125 runs, the photoreceptor drum 121 of the magenta unit 12M transcribes a toner image of the magenta toner on the intermediate transcription belt 125. Subsequently, the cyan unit 12C transcribes a toner image of the cyan toner on the magenta toner image. Thereafter, the yellow unit 12Y transcribes a toner image of the yellow toner on the toner image formed by overlapping the magenta toner and the cyan toner. Finally, the black unit 12Bk transcribes a toner image of the black toner on the toner image formed by overlapping the magenta toner, the cyan toner and the yellow toner to complete a full-color toner image. The full-color toner image completed on the intermediate transcription belt 125 is transcribed on the sheet P fed from the storage unit 14.

The feeding path 110 vertically extends at a left side of the image forming unit 12. The conveyance roller pair 119 is arranged on the feeding path 110. The sheet P fed from the storage unit 14 is conveyed with the conveyance roller pair 119 and guided by the feeding path 110, and directs to the secondary transcription nip formed with the secondary transcription roller 118 and the intermediate transcription belt 125, which are described later. The secondary transcription roller 118 is arranged on the feeding path 110. The secondary transcription roller 118 confronts the driver roller 125a wound with the intermediate transcription belt 125. The secondary transcription roller 118 comes in contact with the outer peripheral surface of the intermediate transcription belt 125 to forms a secondary transcription nip portion. The sheet P guided by the feeding path 110 and sent to the secondary transcription nip portion between the intermediate transcription belt 125 and the secondary transcription roller 118 is pressed and held between the intermediate transcription belt 125 and the secondary transcription roller 118. Consequently, the full-color toner image completed on the intermediate transcription belt 125 is transcribed onto the sheet P.

The image forming apparatus 10 further comprises a cleaning device 128. The cleaning device 128 removes the toner remaining on the intermediate transcription belt 125 to clean it after the transcription of the toner image to the sheet P (generally referred to as the secondary transcription). The cleaning device 128 confronts the idle roller 125b.

The fixation unit 13 performs fixation process to the toner image after the transcription onto the sheet P with the image forming unit. The fixation unit 13 includes a heating roller 131, a fixation roller 132 confronting the heating roller 131, a fixation belt 133 extending between the heating roller 131 and the fixation roller 132, and a pressure roller 134 confronting and pressing against the fixation roller 132. The heating roller 131 is internally equipped with a conductive heating element, which is used as the heating source.

The sheet P bearing the toner image is sent to the fixation unit 13. While the sheet P passes between the pressure roller 134 and the high temperature fixation belt 133, the toner image is subject to heat from the fixation belt 133 and is fixed to the sheet P.

The fixation process by the fixation unit 13 is completed, and the color printing is ended. The sheet P after the color printing is guided from the fixation unit 13 to a feeding path 114 extending upward, and discharged to the discharge section 15 from the right surface of the joint housing 113. The upper surface of the lower housing 111 is used as a discharge tray 151 configured to support the sheet P after the color printing.

An intermediary device 60 is arranged in the lower housing 111 along the front wall of the lower housing 111. The upper surface of the intermediary device 60 is configured to support a front end of the toner cartridges 20, respectively. The elements of the image forming apparatus (the photoreceptor drum 121, the intermediate transcription belt 125, the development device 122 and the charger 123) are arranged beside a rear surface of the intermediary device 60. The intermediary device 60 guides the toner supplied from the toner cartridge 20 toward each development devices 122 arranged below the intermediate transcription belt 125.

The intermediary device 60 further accommodates waste toner arising after the transcription process. A cleaning device 127 is arranged at a left side of each photoreceptor drum 121. The cleaning device 127 removes the toner remaining on the circumferential surface of the photoreceptor drum 121 after the transcription of the toner image to the intermediate transcription belt 125 (referred to as the primary transcription) is complete, and the removed toner is accommodated in the intermediary device 60 as waste toner. The circumferential surface of the photoreceptor drum 121, which is cleaned by the cleaning device 127, moves toward the charger 123 to be newly subject to the charge processing. Moreover, the cleaning device 128 confronts the idle roller 125b on a right side of the intermediate transcription belt 125. The cleaning device 128 removes the toner remaining on the outer peripheral surface of the intermediate transcription belt 125 after the transcription of the toner image to the sheet P (referred to as the secondary transcription) is complete. The removed toner is accommodated in the intermediary device 60 as waste toner. The outer peripheral surface of the intermediate transcription belt 125 cleaned with the cleaning device 128 thereafter receives the transcription of a new toner images from each photoreceptor drum 121.

Figure 14:
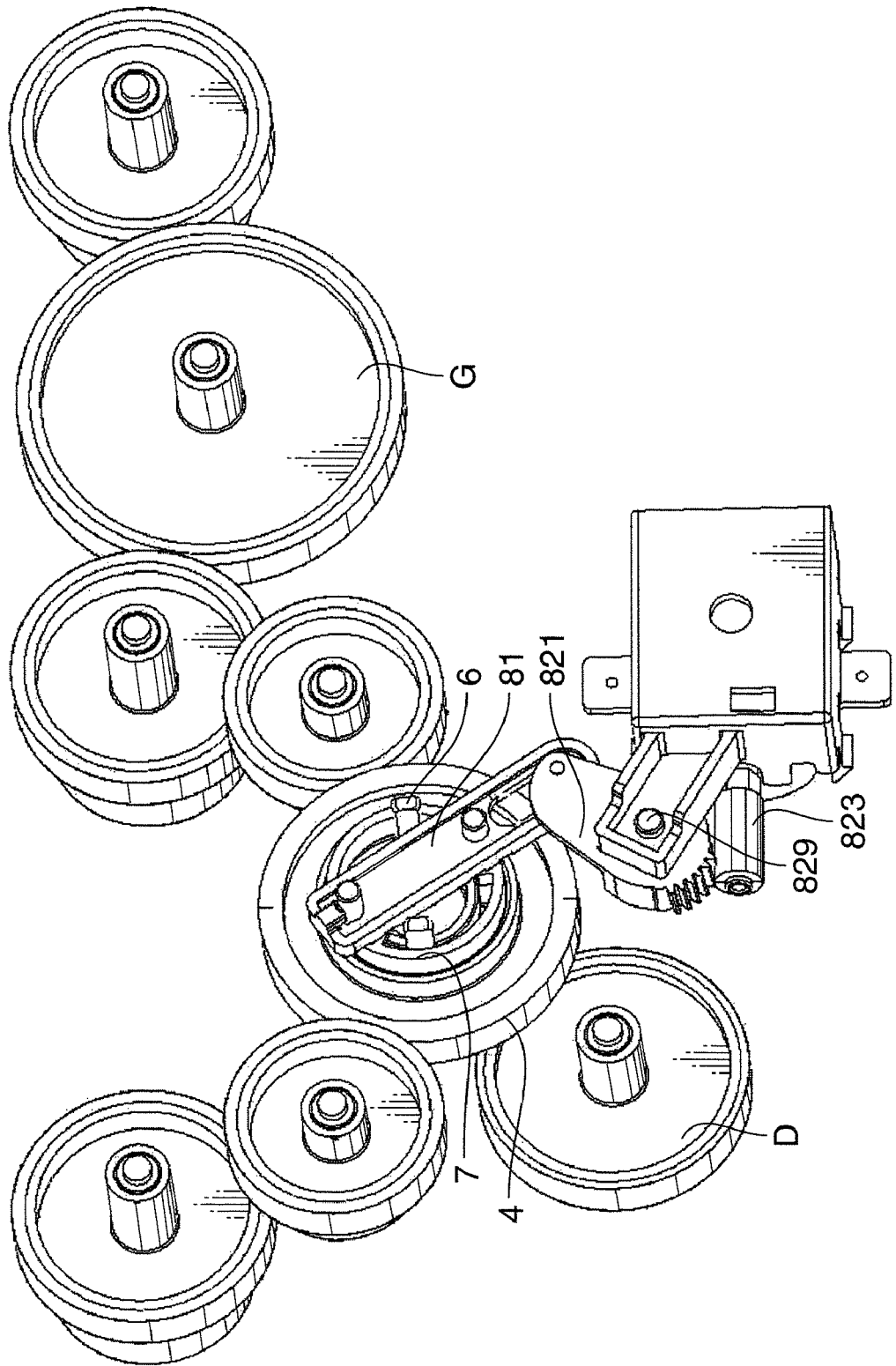
FIG. 14 is a perspective diagram schematically showing a connection between the clutch mechanism and the development device according to the first embodiment.
Figure 15:
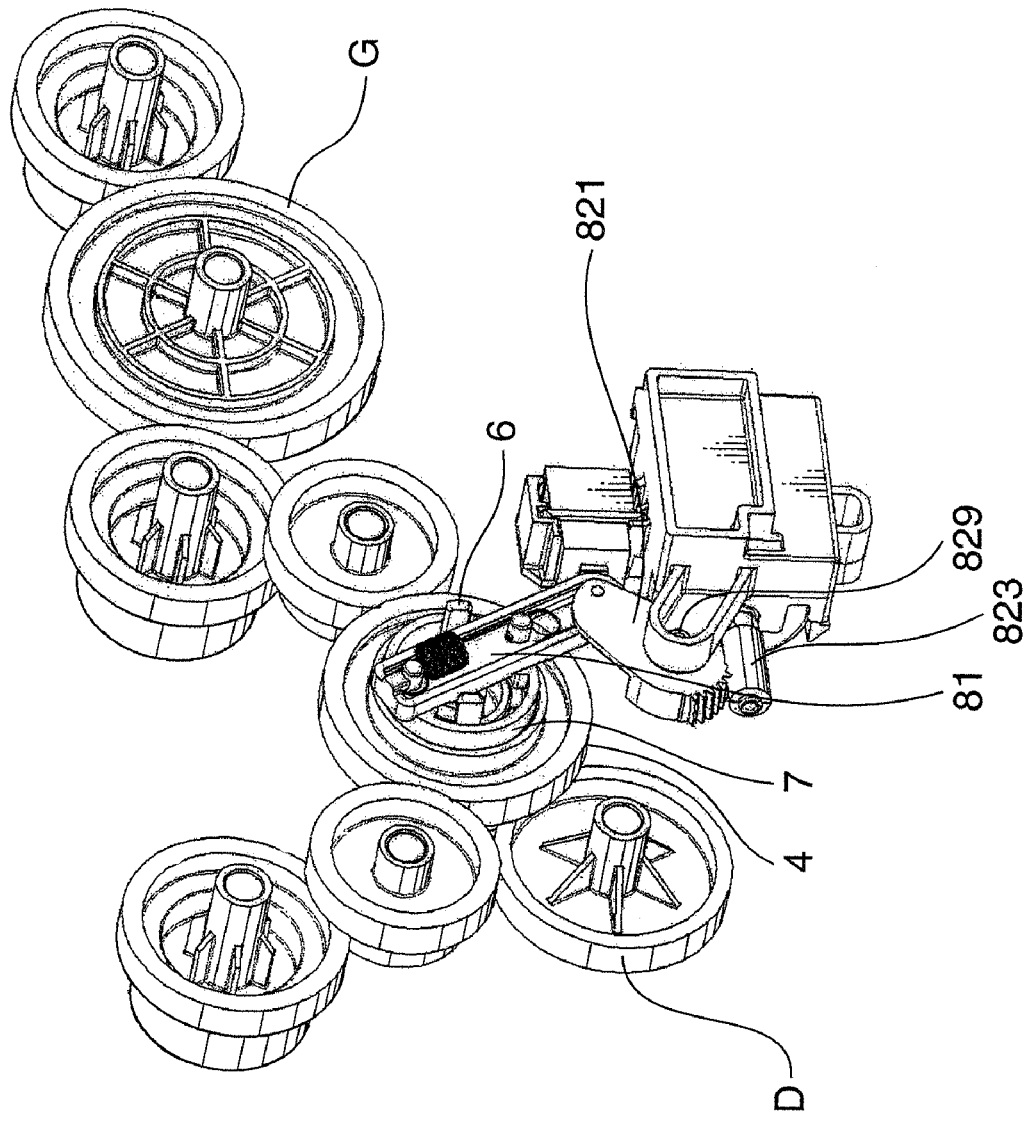
FIG. 15 is a perspective diagram schematically showing the connection between the clutch mechanism and the development device according to the second embodiment.

FIG. 14 shows the clutch mechanism 1 according to the first embodiment connected to a drive unit of the development device 122 described with reference to FIGS. 12 and 13. FIG. 15 shows the clutch mechanism 1 according to the second embodiment connected to the drive unit of the development device 122 described with reference to FIGS. 12 and 13. Drive of the development device 122 is now described with reference to FIGS. 1, 2 and 6 as well as FIG. 12 to FIG. 15.

The clutch mechanism 1 of the image forming apparatus 10 described in the context of FIGS. 12 and 13 may intermittently transmit the driving force to the several development devices 122. FIG. 14 and FIG. 15 show a drive gear D connected to a drive source (not shown) configured to cause the driving force to drive the development device 122. The drive gear D engages with the input gear 3, which rotates together with the drive gear D. As described above, while the first member 6 is accommodated in the second member 7, the output gear 4 is apart from the input gear 3. Accordingly, while the input gear 3 rotates, the output gear 4 is stationary.

When the swing drive source 824 is operated so that the gear element 823 rotates, the swing member 821 rotates around the rotating shaft 829. The main arm 81 thereby swings. When the main arm 81 swings and the second member 7 reaches the second rotational position, the first member 6 is pushed out from the second member 7 to press the output gear 4 against the input gear 3. Consequently, the protrusion 42 of the output gear 4 engages with the protrusion 32 of the input gear 3, so that the driving force transmitted to the input gear 3 is transmitted to the output gear 4. The output gear 4 is connected to several gears G continuing to the drive unit of the development apparatus 122. Accordingly, when the output gear 4 rotates upon receiving the driving force from the input gear 3, the gears G of the development device 122 connected to the output gear 4 rotates, so that the development device 122 is thereby operated.

When the swing drive source 824 is subject to reverse rotation, the output gear 4 is displaced apart from the input gear by the first elastic member 5 via the opposite steps to the abovementioned steps. Consequently, the output gear 4 and the gears G of the development device 122 connected to the output gear 4 are stopped.

The foregoing clutch mechanism 1 may switch the transmission of the driving force by using smaller elements. Moreover, the clutch mechanism 1 has high structural strength even if it is formed using the smaller elements.

Since the operational range of the elements of the clutch mechanism 1 is mechanically and/or electrically limited, the clutch mechanism 1 more accurately operates with less noise arising among the elements.

This application is based on Japanese Patent application serial Nos. 2009-292176 and 2010-042940 filed in Japan Patent Office on Dec. 24, 2009 and Feb. 26, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A clutch mechanism for transmitting a driving force from a drive source comprising:
   a support plate formed with a through-hole;
   an input element rotatably mounted on the support plate, the driving force from the drive source being input to the input element;
   an output element arranged between the support plate and the input element and mounted on the support plate so as to rotate upon receiving the driving force from the input element;
   a first elastic member arranged between the input element and the output element and configured to bias the output element toward the support plate;
   a first member arranged between the output element and the support plate and including a first slide surface and a sliding arm inserted through the through-hole; and
   a second member configured to accommodate the first member and including a second slide surface confronting the first slide surface, wherein
   insertion of the sliding arm through the through-hole allows the first member to approach and move away from the support plate,
   when the second member is at a first rotational position where the second member accommodates the first member, the first elastic member moves the output element apart from the input element to cut off transmission of the driving force from the input element to the output element,
   when the second member rotates from the first rotational position to a second rotational position so that the second slide surface moves toward the first slide surface, the first member pushed out from the second member by the first slide surface and the second slide surface presses the output element against the input element, so that the output element outputs the driving force transmitted from the input element.

2. The clutch mechanism according to claim 1, further comprising a link mechanism configured to rotate the second member between the first rotational position and the second rotational position, wherein
   the support plate is formed with an arc slit,
   the second member includes a movable arm inserted through the slit,
   the link mechanism includes:
   a main arm connected to the movable arm, the main arm and the second member sandwiching the support plate; and
   a swing mechanism configured to swing the main arm, and
   a swing axis of the main arm coincides with a rotational axis of the second member.

3. The clutch mechanism according to claim 2, wherein
   the swing mechanism includes:
   a connection piece connected to the main arm;
   a swing member connected to the connection piece; and
   a swing drive source configured to reciprocally rotate the swing member,
   the swing member rotates around a rotational axis apart from the swing axis, and
   the connection piece reciprocates along the main arm while the swing member reciprocally rotates.

4. The clutch mechanism according to claim 3, wherein
   the swing member includes a gear having a circumferential surface formed with a gear tooth,
   the swing drive source includes a gear element configured to engage with the gear tooth to rotate the swing member, and
   a center angle of the circumferential surface formed with the gear tooth is less than a central angle of a complete circle.

5. The clutch mechanism according to claim 4, wherein the swing mechanism includes a controller configured to control the swing drive source to define a rotational range of the swing member.

6. The clutch mechanism according to claim 5, wherein
   the controller includes:
   a switch configured to switch between ON-mode and OFF-mode while the second member rotates between the first rotational position and the second rotational position; and
   a signal generator configured to generate a first signal for controlling the swing drive source to rotate the swing member in a first direction and a second signal for controlling the swing drive source to rotate the swing member in a second direction opposite to the first direction,
   the signal generator controls the swing drive source to stop rotation of the swing member in the first direction after a first period passes from a switching timing between the ON-mode and the OFF-mode, and
   the signal generator controls the swing drive source to stop rotation of the swing member in the second direction after a second period passes from the switching timing between the On-mode and the OFF-mode.

7. The clutch mechanism according to claim 6, wherein
   the switch includes a button configured to work for switching between the ON-mode and the OFF-mode, and
   at least one of the main arm and the swing member presses the button.

8. The clutch mechanism according to claim 4, wherein
   the swing mechanism includes a second elastic member configured to apply to the gear a moment around the rotational axis, and
   the second elastic member biases the gear toward the swing axis.

9. A processing device for performing a given process comprising:
- a drive source;
- a processing unit configured to perform a given operation by a driving force from the drive source; and
- a clutch mechanism configured to intermittently transmit the driving force from the drive source to the processing unit, wherein the clutch mechanism includes:
- a support plate formed with a through-hole;
- an input element rotatably mounted on the support plate, the driving force from the drive source being input to the input element;
- an output element arranged between the support plate and the input element and mounted on the support plate so as to rotate upon receiving the driving force from the input element;
- a first elastic member arranged between the input element and the output element and configured to bias the output element toward the support plate;
- a first member arranged between the output element and the support plate and including a first slide surface and a sliding arm inserted through the through-hole; and
- a second member configured to accommodate the first member and including a second slide surface confronting the first slide surface, wherein insertion of the sliding arm through the through-hole allows the first member to approach and move apart from the support plate, when the second member is at a first rotational position where the second member accommodates the first member, the first elastic member moves the output element apart from the input element to cut off transmission of the driving force from the input element to the output element, and when the second member rotates from the first rotational position to a second rotational position so that the second slide surface moves toward the first slide surface, the first member pushed out from the second member by the first slide surface and the second slide surface presses the output element against the input element, so that the output element outputs the driving force transmitted from the input element.

10. An image forming apparatus for forming a toner image on a sheet comprising:
- an image bearing element configured to bear the toner image;
- a development device configured to supply toner to the image bearing element;
- a drive source configured to cause a driving force to operate the development device; and
- a clutch mechanism configured to intermittently transmit the driving force from the drive source to the development device, wherein the clutch mechanism includes:
- a support plate formed with a through-hole;
- an input element rotatably mounted on the support plate, the driving force from the drive source being input to the input element;
- an output element arranged between the support plate and the input element and mounted on the support plate so as to rotate upon receiving the driving force from the input element;
- a first elastic member arranged between the input element and the output element and configured to bias the output element toward the support plate;
- a first member arranged between the output element and the support plate and including a first slide surface and a sliding arm inserted through the through-hole; and
- a second member configured to accommodate the first member and including a second slide surface confronting the first slide surface, wherein insertion of the sliding arm through the through-hole allows the first member to approach and move apart from the support plate, when the second member is at a first rotational position where the second member accommodates the first member, the first elastic member moves the output element apart from the input element to cut off transmission of the driving force from the input element to the output element, and when the second member rotates from the first rotational position to a second rotational position so that the second slide surface moves toward the first slide surface, the first member pushed out from the second member by the first slide surface and the second slide surface presses the output element against the input element, so that the output element outputs the driving force transmitted from the input element.

11. The image forming apparatus according to claim 10, wherein
- the development device includes a first development device configured to supply a first color of toner and a second development device configured to supply a second color of toner different from the first color,
- when the second member is in the first rotational position, the output element does not output the driving force to the first development device and the second development device, and
- when the second member is in the second rotational position, the output element outputs the driving force to the first development device and the second development device.

* * * * *